(12) United States Patent
Ali et al.

(10) Patent No.: US 12,380,330 B1
(45) Date of Patent: Aug. 5, 2025

(54) METHOD AND SYSTEM FOR USING A FORWARD CALIBRATION MODEL TO GENERATE CALIBRATED VALUES FOR AMBIENT PARAMETERS

(71) Applicant: ECOSYSTEM INFORMATICS INC., Mississauga (CA)

(72) Inventors: Shirook Ali, Milton (CA); Mohamed Bakr, Hamilton (CA)

(73) Assignee: Ecosystem Informatics Inc., Mississauga (CA)

( * ) Notice: Subject to any disclaimer, the term of this patent is extended or adjusted under 35 U.S.C. 154(b) by 21 days.

(21) Appl. No.: 18/595,104

(22) Filed: Mar. 4, 2024

(51) Int. Cl.
*G06N 20/00* (2019.01)
*G06N 3/08* (2023.01)

(52) U.S. Cl.
CPC ...................................... *G06N 3/08* (2013.01)

(58) Field of Classification Search
None
See application file for complete search history.

(56) References Cited

U.S. PATENT DOCUMENTS 10,948,471 B1  3/2021  MacMmullin et al.
2021/0003461 A1  1/2021  Tarkoma et al.

OTHER PUBLICATIONS

Darvishi Hossein et al, "Sensor-Fault Detection, Isolation and Accommodation for Digital Twins via Modular Data-Driven Architecture", IEEE Sensors Journal, IEEE, USA, vol. 21 No. 4, Oct. 7, 2020, pp. 4827-4838, (12 pages).
Extended European Search Report received for European Application No. 22787186.0, mailed on Jan. 21, 2025 (8 pages).

*Primary Examiner* — David R Vincent

(57) ABSTRACT

Embodiments herein generally relate to methods and systems for using a forward calibration model to generate calibrated values for ambient parameters. In at least one example, the method for calibrating a measured un-calibrated ambient parameter (AP) value, includes generating, using an optimization model, a predicted calibrated AP value corresponding to the un-calibrated ambient parameter (AP); inputting, into a trained forward calibration model: (i) the predicted calibrated AP value; and (ii) one or more accuracy-enhancing parameters; generating, using the trained forward calibration model, a predicted un-calibrated AP value; determining if an error difference between the predicted un-calibrated AP value and measured un-calibrated ambient parameter (AP) value, is below a pre-determined threshold; if not, using the optimization model, to generate an updated predicted calibrated AP value and iterating the method, and otherwise outputting the predicted calibrated AP value, as the calibrated AP value.

20 Claims, 16 Drawing Sheets

METHOD AND SYSTEM FOR USING A FORWARD CALIBRATION MODEL TO GENERATE CALIBRATED VALUES FOR AMBIENT PARAMETERS

FIELD

The disclosed embodiments generally relate to monitoring of ambient air parameters, and in particular, to a method and system for using a forward calibration model to generate calibrated values for ambient parameters.

BACKGROUND

Ambient air parameters, such as the concentration of gaseous air pollutants and air temperature, may be monitored for a variety of reasons, such as alerting populations of health risks, evaluating compliance with air quality standards, and mapping air quality patterns. There remains a need in the art for accurate, economical, and efficient monitoring of ambient parameters, particularly using sensors mounted on mobile platforms.

SUMMARY

In at least one broad aspect, there is provided a method for calibrating a measured un-calibrated ambient parameter (AP) value, comprising: generating, using an optimization model, a predicted calibrated AP value ($s[k]_{calibrated\ (predicted)}$) corresponding to the un-calibrated ambient parameter (AP) ($s[k]_{un\text{-}calibrated\ (actual)}$); inputting, into a trained forward calibration model: (i) the predicted calibrated AP value ($s[k]_{calibrated\ (predicted)}$); and (ii) one or more accuracy-enhancing parameters ($p[k]$); generating, using the trained forward calibration model, a predicted un-calibrated AP value ($s[k]_{un\text{-}calibrated\ (predicted)}$); determining if an error difference between the predicted un-calibrated AP value ($s[k]_{un\text{-}calibrated\ (predicted)}$) and measured un-calibrated ambient parameter (AP) value, is below a predetermined threshold; if not, using the optimization model, to generate an updated predicted calibrated AP value ($s[k]_{calibrated\ (predicted)}$) and iterating the method, and otherwise outputting the predicted calibrated AP value ($s[k]_{un\text{-}calibrated\ (predicted)}$), as the calibrated AP value.

In some examples, the method is executed using at least one processor of a server computer.

In some examples, the trained forward calibration model is a trained artificial neural network (ANN) model.

In some examples, the optimization model uses one or more of a Dichotomous Search, Interval Halving, Fibonacci search, and Golden Section Search.

In some examples, the method further comprises, determining the error difference is preformed using the optimization model.

In some examples, the method further comprises, initially training the forward calibration model by: accessing one or more training dataset points, each dataset point comprising: (i) a first measured value of an AP, generated by a first sensor, at a time instance, and (ii) a second, time-paired measured value for the AP, generated by at least one reference sensor, at the time instance, wherein the first and second values are measured in a localized area surrounding the at least one reference sensor; and (iii) time-paired accuracy-enhancing parameters; and training the forward calibration model based on the training dataset points.

In some examples, the method further comprises, training one or more AP-specific forward calibration models, using AP-specific training datasets.

In some examples, prior to the inputting of data into the trained calibration model, selecting an AP-specific forward calibration model corresponding to the type of AP being calibrated.

In some examples, the method further comprises, training one or more sensor-specific forward calibration models, using sensor-specific training datasets.

In some examples, the method further comprises, initially, receiving the measured un-calibrated ambient parameter (AP) value from a mobile or stationary data acquisition system, wherein the mobile data acquisition system is mounted to a mobile platform.

In another broad aspect, there is provided a system for calibrating a measured un-calibrated ambient parameter (AP) value, comprising: at least one AP sensor associated with a data acquisition system (DAS), the at least one AP sensor configured to generate the un-calibrated AP value; and at least one processor configured for: generating, using an optimization model, a predicted calibrated AP value ($s[k]_{calibrated\ (predicted)}$) corresponding to the un-calibrated ambient parameter (AP) ($s[k]_{un\text{-}calibrated\ (actual)}$); inputting, into a trained forward calibration model: (i) the predicted calibrated AP value ($s[k]_{calibrated\ (predicted)}$); and (ii) one or more accuracy-enhancing parameters ($p[k]$); generating, using the trained forward calibration model, a predicted un-calibrated AP value ($s[k]_{un\text{-}calibrated\ (predicted)}$); determining if an error difference between the predicted un-calibrated AP value ($s[k]_{un\text{-}calibrated\ (predicted)}$) and measured un-calibrated ambient parameter (AP) value, is below a predetermined threshold; if not, using the optimization model, to generate an updated predicted calibrated AP value ($s[k]_{calibrated\ (predicted)}$) and iterating the method, and otherwise outputting the predicted calibrated AP value ($s[k]_{un\text{-}calibrated\ (predicted)}$), as the calibrated AP value.

In some examples, wherein the at least one processor includes two processors.

In some examples, wherein the trained forward calibration model is a trained artificial neural network (ANN) model.

In some examples, wherein the optimization model uses one or more of a Dichotomous Search, Interval Halving, Fibonacci search, and Golden Section Search.

In some examples, wherein determining the error difference is preformed using the optimization model.

In some examples, the at least one processor being further configured for initially training the forward calibration model by: accessing one or more training dataset points, each dataset point comprising: (i) a first measured value of an AP, generated by a first sensor, at a time instance, and (ii) a second, time-paired measured value for the AP, generated by at least one reference sensor, at the time instance, wherein the first and second values are measured in a localized area surrounding the at least one reference sensor; and (iii) time-paired accuracy-enhancing parameters; and training the forward calibration model based on the training dataset points.

In some examples, further comprising the at least one processor before further configured for training one or more AP-specific forward calibration models, using AP-specific training datasets.

In some examples, wherein prior to the inputting of data into the trained calibration model, the at least one processor configured for selecting an AP-specific forward calibration model corresponding to the type of AP being calibrated.

In some examples, the at least one processor before further configured for training one or more sensor-specific forward calibration models, using sensor-specific training datasets.

In some examples, the at least one processor being further configured for, initially, receiving the measured un-calibrated ambient parameter (AP) value from a mobile or stationary data acquisition system, wherein the mobile data acquisition system is mounted to a mobile platform.

In different embodiments, the present invention may comprise a method or system comprising any combination of elements or features described herein, or which specifically omits any particular feature or element described herein.

BRIEF DESCRIPTION OF THE DRAWINGS

In the drawings, like elements may be assigned like reference numerals. The drawings are not necessarily to scale, with the emphasis instead placed upon the principles of the present disclosure. Additionally, each of the embodiments depicted are but one of a number of possible arrangements utilizing the fundamental concepts of the present disclosure.

DETAILED DESCRIPTION OF THE EMBODIMENTS

Figure 1:
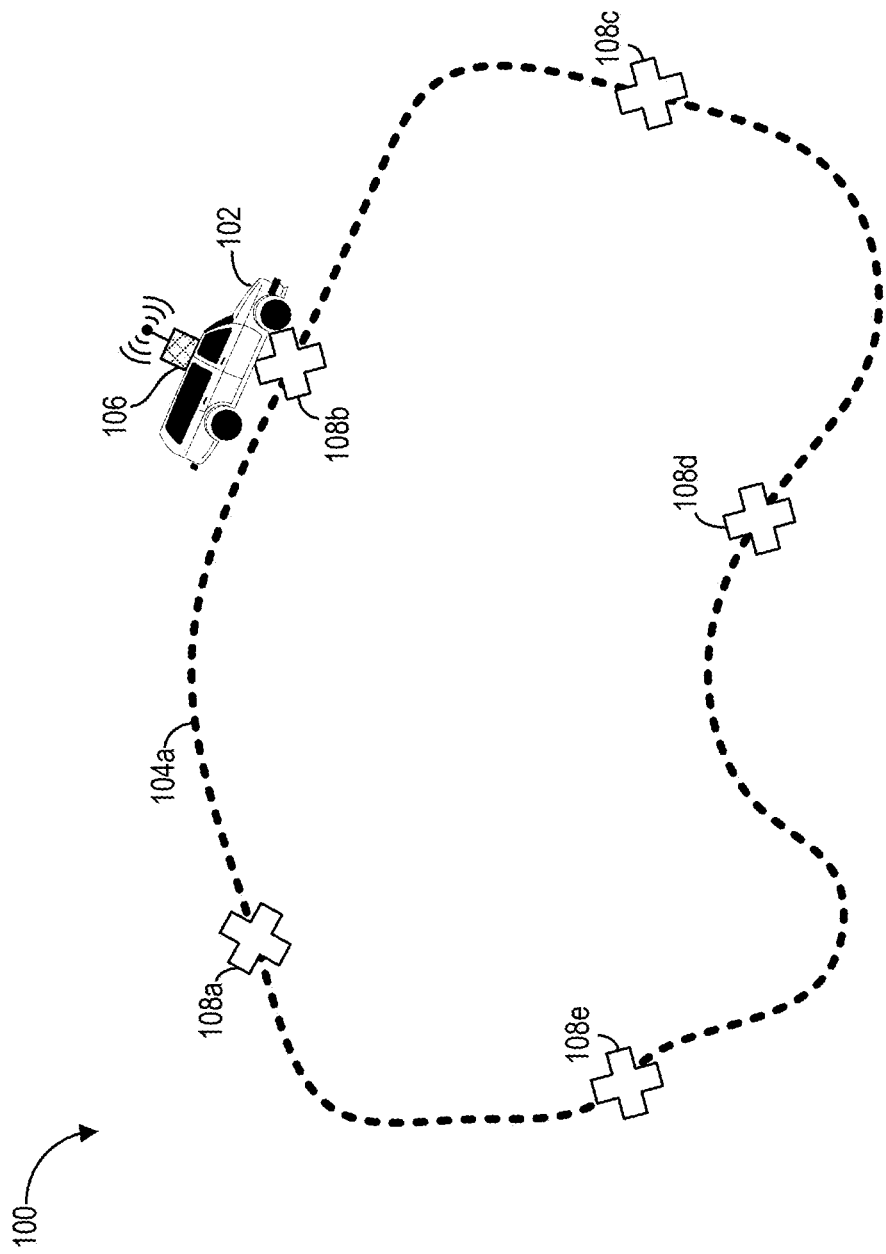
FIG. 1 is an illustration of a mobile platform, equipped with a mobile data acquisition system, moving along a data collection route.

As stated in the background, ambient air parameters (APs), such as the concentration of gaseous air pollutants and air temperature, may be monitored for a variety of reasons using various sensors. While the monitoring sensors may be stationary or mobile, a mobile sensor can monitor air quality over a greater geographic area than would be possible if the sensor were stationary.

I. Definitions

Any term or expression not expressly defined herein shall have its commonly accepted definition understood by a person skilled in the art. As used herein, the following terms have the following meanings.

"Ambient parameter" or "AP" refers to any physically measurable property of air. In embodiments, the AP may be a concentration of a gaseous component of air with non-limiting examples of such gaseous components being carbon monoxide (CO), carbon dioxide ($CO_2$), nitrous oxide (NO), nitrogen oxides of the formula $NO_x$ such as nitrogen dioxide ($NO_2$), ozone ($O_3$), methane ($CH_4$), and sulfur oxides of the formula $SO_x$ such as sulfur dioxide ($SO_2$). In other embodiments, the AP may be a concentration of suspended particulate matter (PM) in general, or a concentration of suspended particulate matter of a specific composition such as lead. In still other non-limiting embodiments, the AP may be a weather condition, such as air temperature, humidity, barometric pressure, and wind speed.

"GPS module" refers to a device that includes an antenna for receiving satellite navigation signals (e.g., signals transmitted by the Global Positioning System (GPS), the Global Navigation Satellite System (GLONASS), the Galileo positioning system, the Beidou Navigation Satellite System, or satellite navigation systems), and an operatively connected processor that is configured with a set of instructions stored on a memory, to analyze such signals to determine the location of the module, and optionally, other kinematic information such as distance travelled, direction of movement, speed, and acceleration of the module. GPS modules are known in the art, and do not, by themselves constitute the present invention. Persons skilled in the art may refer to a satellite navigation signal receiver module as a "GPS receiver," or a "GNSS receiver," depending on the type of satellite navigation signal used by the module.

"Memory" refers to a non-transitory tangible computer-readable medium for storing information in a format readable by a processor, and/or instructions readable by a processor to implement an algorithm. The term "memory" includes a plurality of physically discrete, operatively connected devices despite use of the term in the singular. Non-limiting types of memory include solid-state, optical, and magnetic computer readable media. Memory may be non-volatile or volatile. Instructions stored by a memory may be based on a plurality of programming languages known in the art, with non-limiting examples including the C, C++, Python™, MATLAB™, and Java™ programming languages.

"Mobile platform" refers to any device, or object, which is not necessarily limited to a fixed stationary geolocation and/or is otherwise able to move between geolocations. Mobile platforms may include any consumer or industrial means of transportation, such as automobiles, trucks, buses, trains, tractors, motorcycles, or bicycles, whether powered or not. Mobile platforms may further include handheld or portable devices or objects which are manually moved, such as by a pedestrian. For example, these can include handheld phones, but can also include backpacks, suitcases, and the like.

"Reference sensor unit" refers to any device unit that includes one or more sensors. In some examples, the one or more sensors may measure different ambient parameters (APs). For instance, each sensor, in the reference unit, can measure a single, corresponding AP. The sensors can be scientific-grade sensors, which generate highly accurate sensor readings. Each reference sensor unit can also include other hardware, such as hardware for stabilizing and/or calibrating sensor data (e.g., vibration platforms, temperature and humidity control systems, etc.). A reference sensor unit can be stationary in a fixed geographic location and/or mobile. If the reference sensor unit is mobile, it can be mounted to, or integrated within (e.g., partially, or fully integrated), a mobile platform.

"Processor" refers to one or more electronic devices that is/are capable of reading and executing instructions stored on a memory to perform operations on data, which may be stored on a memory or provided in a data signal. The term "processor" includes a plurality of physically discrete, operatively connected devices despite use of the term in the singular. Non-limiting examples of processors include devices referred to as microprocessors, microcontrollers, central processing units (CPU), and digital signal processors.

"Training", refers to a process, implemented by a processor according to an algorithm stored in a memory, that determines the value(s) of one or more variable(s) of the rule(s) defining a calibration model, based on a training dataset of known values of an ambient parameter generated by both a mobile and stationary sensor (as well as, in some examples, known values of other accuracy-enhancing parameters) in order to calibrate, and increase the accuracy of the value of the ambient parameter as measured by the mobile sensor.

II. General Overview

FIG. 1 illustrates a mobile platform (102) moving along a data collection route (104a). For ease of description, mobile platform (102) is exemplified as a vehicle.

Data collection route (104a) may define a path through an indoor and/or outdoor environment (100). While FIG. 1 illustrates the data collection route (104a) as a closed loop, route (104a) is not so limited. In other words, route (104a) may have any desired route or path configuration, including any open and/or closed configuration.

As shown, a data acquisition system (106)—or DAS (106), for short—is mounted to the mobile platform (102).

As explained with reference to FIG. 9, DAS (106) includes a processor (902) coupled to a memory (904), as well as a sensor subsystem (908).

Sensor subsystem (908) includes one or more ambient parameters (AP) sensors (908a), whereby each AP sensor monitors and/or measures various respective APs (e.g., CO, particulate matter (PM), $CO_2$, NO, $SO_2$ concentrations, etc.). The sensor subsystem (908) can also include environmental parameters (EP) sensors (908b), for measuring various other ambient environmental parameters (e.g., humidity, wind speed, air temperature, etc.).

As used herein, sensors in the DAS (106) are referenced as "data acquisition system (DAS) sensors", which generate respective DAS sensor data. The DAS sensors can include one or more AP sensors (908a), and EP sensors (908b).

Continuing with reference to FIG. 1, in the illustrated example, DAS (106) is a mobile system, which moves to different positions along the data collection route (104a). Accordingly, the sensors measure various APs (and EPs), at different geographic positions along the data collection route (104a).

In these examples, the DAS (106) can be mounted to the mobile platform (102), as explained previously. In some cases, DAS (106) is physically separate from the mobile platform (102). In other cases, DAS (106) may also be fully or partially integrated within the mobile platform (102). For example, the mobile DAS (106) can comprise an electronic hardware portion of a vehicle's on-board computing system.

As the mobile platform (102) traverses the data collection route (104a), the DAS sensors measure respective ambient parameters (APs). For example, the DAS sensors may generate sensor data indicative of CO concentration at each of several different geographic locations (108a)-(108e), along route (104a). Each DAS sensor can generate corresponding sensor data, for a corresponding monitored AP.

Once the sensor data is collected, the sensor data may be processed for use in a wide variety of applications. For example, the DAS sensor data can allow determining air quality patterns in the environment (100). In some examples, the system generates a report which includes the determined air quality patterns.

It is also possible for the DAS (106) to be permanently or temporarily stationary. In these cases, the DAS sensors only measure APs (and EPs) at only a single geographic location.

To this end, while the DAS sensors offer a unique advantage in enabling monitoring over a greater geographic area, these sensors also suffer from distinct drawbacks.

For example, changing vehicle motion results in temperature, wind direction, and wind speed variations, which can affect the accuracy of the DAS sensor readings. This, in turn, has practical implications for the cost, efficiency, and reliability of monitoring performed on a large mobility scale. Some of these factors also affect sensor readings, even when the data acquisition system (DAS) is fixed or stationary. For instance, temperature and humidity factors can still affect the accuracy of fixed or stationary sensor readings.

Notably, these error-inducing factors are problematic where it is desirable for the DAS to generate high accuracy sensor readings.

In many cases, generating highly accurate sensor readings requires large, bulky and expensive systems. These systems encapsulate expensive, high profile, scientific-grade sensors, as well as additionally, heavy, and sophisticated hardware for stabilizing and calibrating sensor readings to compensate for the various error-inducing factors, e.g., as noted above. The hardware can include, for example, temperature and humidity control systems, and the like.

For mobile DASs, the hardware can additionally include large and sophisticated anti-vibration platforms for the sensors. The hardware requires customization to accommodate specific use applications.

In turn, owing to their bulky, heavy weight and expensive nature, it is difficult to deploy data acquisition systems (DASs) in a highly scalable manner, i.e., to achieve wide geographic monitoring of ambient parameters. For example, the costly nature of these systems makes it prohibitive to deploy many of these systems around many fixed or mobile positions. Additionally, the large size and heavy weight also makes it difficult for laypersons to easily mount or deploy many the systems around many fixed or mobile positions. In many cases, it is necessary for experienced technicians to be present to securely mount the heavy DAS enclosures to fixed or mobile platforms. More generally, the bulky size of these systems makes them visually unappealing when mounted to platforms.

In view of the foregoing, described embodiments provide for a method and system for calibrating inaccurate measured ambient parameter (AP) values using machine learning models.

As described, disclosed examples allow generating more accurate measurements of AP values without necessitating high grade and/or expensive sensors. Rather, high accuracy is achievable using only low-cost, and low-profile sensors. In turn, this reduces the overall cost of the data acquisition system.

As well, described examples do not necessitate use of expensive and heavy-weight ancillary hardware (e.g., stabilizing or calibrating hardware for sensors) to generate accurate sensor readings. This, as well, reduces the overall cost of the system, and also enables encapsulating the system in a lightweight and small form factor enclosure. This light weight and small form factor enclosure is more easily deployed, by laypersons, to both fixed and mobile platforms.

More broadly, owing to the low cost, light weight, and small form factor nature of the described data acquisition systems (DASs)—it is possible to deploy the DASs in a highly-scalable manner and achieve wider and more accurate geographic monitoring of ambient parameters.

III. Calibration Models for Calibrating AP Values

As discussed, disclosed embodiments employ machine learning models (referred to herein as "calibration models") to calibrate AP values, generated by data acquisition system (DAS) sensors.

Figure 9:
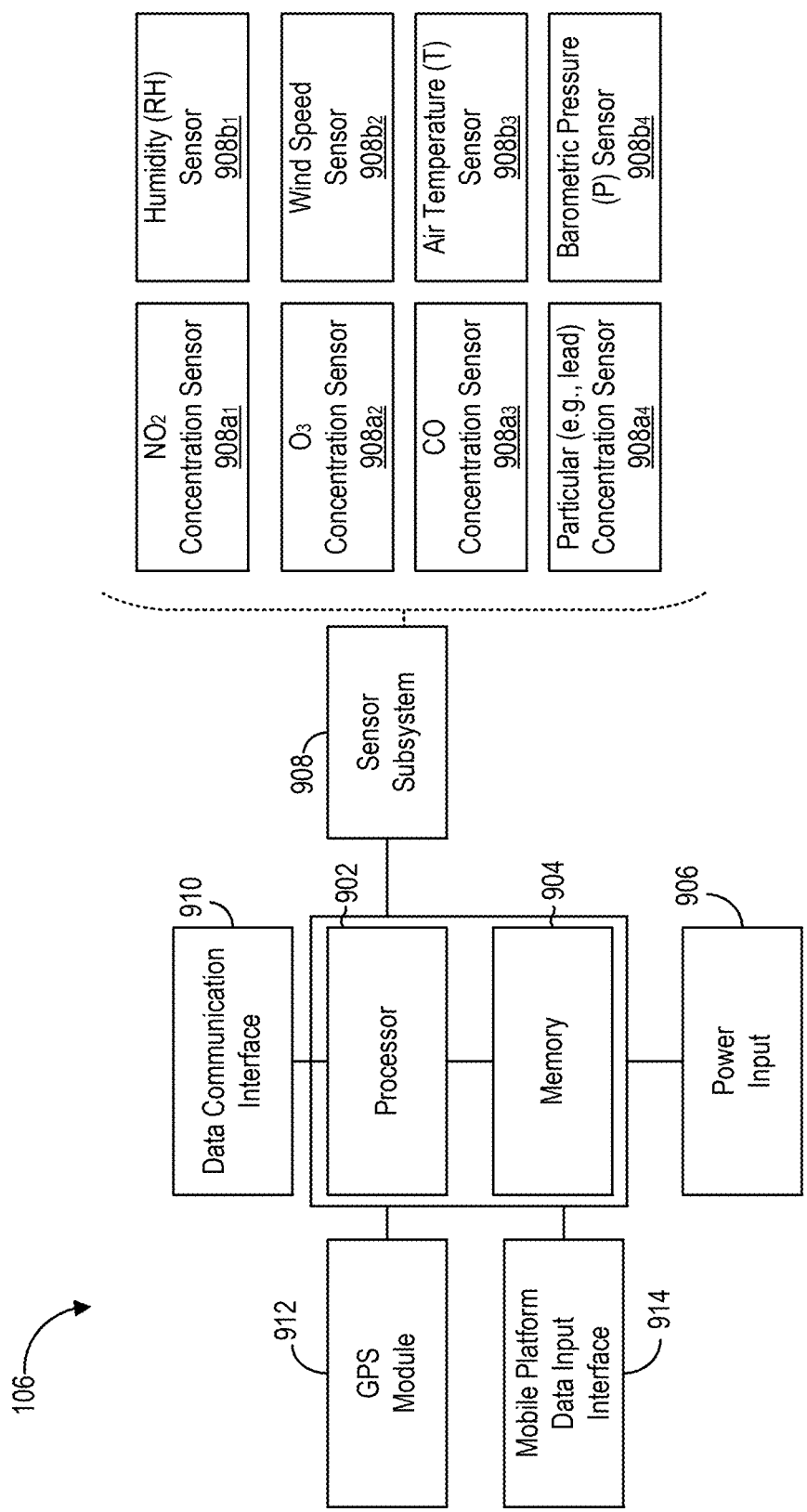
FIG. 9 is a simplified hardware/software block diagram of an example data acquisition system (DAS)

At a general level, the trained models receive un-calibrated AP values, generated by low-cost and low-profile DAS sensors (908) (FIG. 9). In turn, the trained model is used to provide accuracy correction, and output sensor readings with analogous accuracy to high-grade sensors that are stabilized, or calibrated, using expensive hardware.

The use of machine learning models is believed to offer a convenient alternative and/or supplement, to using costly scientific-grade sensors, and/or otherwise, expensive large and heavy-weight stabilization/calibration hardware for sensors, as explained above. More generally, as detailed below, the use of machine learning enables collecting and calibrating data while systems are in motion. This can allow the disclosed systems to accommodate a changing surrounding environment, e.g., resulting from the systems moving through different environments, or more generally, resulting from surrounding weather changes.

In at least one example, the trained calibration models are applied in real-time, or near real-time, to enable real-time or near real-time calibration.

Figure 3A:
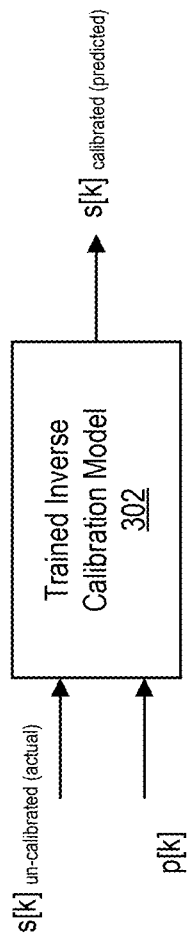
FIG. 3A is a simplified block diagram showing application of a trained inverse calibration model.

FIG. 3A shows a simplified block diagram for an example trained "inverse" calibration machine learning (ML) model (302).

The inverse calibration model (302) is an example of an ML model that can be trained and deployed to adjust for calibration offsets affecting AP values measured using the DAS AP sensors (908a). Model (302) may be, for example, a trained artificial neural network (ANN).

In use, the inverse model (302) is trained to accept two inputs:
(i) Measured Un-calibrated AP Value $(s[k]_{un-calibrated\ (actual)}$: The value measured by an AP sensor located in the DAS (106), at a time step k (e.g., $CO_2$ concentration value), which may be otherwise un-calibrated. This is the value which the model attempts to calibrate; and
(ii) Accuracy-enhancing parameters (p[k]): Various data generated by environmental parameter (EP) sensors (e.g., EP sensors (908b) in FIG. 9) (e.g., temperature, pressure, and wind, GPS location). This data can be amalgamated into a single vector matrix, expressed as (p[k]).

In some examples, accuracy-enhancing parameters also include other AP values, generated by other AP sensors (908a) in DAS (106). For example, if the calibration model is trained to calibrate $CO_2$ measurements, the other AP measurements can include NO or CO measurements.

In still yet other examples, accuracy-enhancing parameters can include one or more mobile platform parameters, associated with the DAS (106) and/or a reference unit (602) (as explained further on). For example, this includes parameter values acquired from the mobile platform data input interface (914) (FIG. 9), e.g., vehicle speed, vehicle location, and the like.

The accuracy-enhancing parameters are time-paired to the un-calibrated AP value. As used herein, "time-paired" refers to values that are recorded at the same time step k, or substantially the same time step (e.g., based on a known sampling rate of the sensors, or a timestamp on the sensor data).

In effect, the inverse model (302) is trained to detect correlations between the accuracy-enhancing parameters (p[k]), at a given time step k, and a relevant calibration offset. This allows the model to generate a predicted, calibrated AP value $(s[k]_{calibrated\ (predicted)})$, based on the non-calibrated measured AP value $(s[k]_{un-calibrated\ (actual)})$.

Nevertheless, it has been appreciated that, to effectively train and deploy the inverse model (302), it is required that that the training data include unique input-output pairs.

For example, in FIG. 3A, it is required that, within the training data, each possible calibrated AP value $(s[k]_{calibrated})$ maps to one unique input $(s[k]_{un-calibrated}$ and p[k]). In turn, this ensures that once the model is trained, each separate combination of inputs $(s[k]_{un-calibrated}$ and p[k]), results in a unique output $(s[k]_{calibrated\ (predicted)})$.

A challenge, however, is that training datasets often include non-unique data. For example, it is likely that, the same or common input $(s[k]_{un-calibrated}; p[k])$ is mapped to different calibrated AP values $(s_A[k]_{calibrated})$ and $(s_B[k]_{calibrated})$. This may result for various reasons, including the effect(s) of unaccounted variables influencing the calibrated output.

Accordingly, when deploying the trained inverse model-trained on this non-unique data—it is possible that the model receives an input $(s[k]_{un-calibrated\ (actual)}$ and p[k]), but generates the incorrect calibrated output (e.g., $s_A[k]_{calibrated\ (predicted)}$ vs. $s_B[k]_{calibrated\ (predicted)})$. This is the problem of "one to many data", which has the effect of reducing the accuracy of the trained model.

Figure 3B:
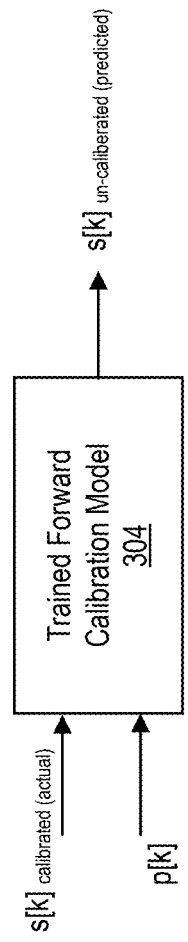
FIG. 3B is a simplified block diagram showing application of a trained forward calibration model.

FIG. 3B shows a simplified block diagram for an example trained forward calibration ML model (304), in accordance with the teachings herein. Forward model (304) is believed to mitigate concerns of the "one to many data" problem.

To clarify this, it is again assumed that the training data includes two non-unique data sets, as explained previously. In the inverse model (302) (FIG. 3A), the model is trained using the following non-unique input-output pairs, expressed in postulation (1):

(a) inputs($s[k]_{un\text{-}calibrated}$ AND $p[k]$) → output
    ($s_A[k]_{calibrated}$);

and (b) inputs($s[k]_{un\text{-}calibrated}$ AND $p[k]$) → output
    ($s_B[k]_{calibrated}$);     Postulation (1)

wherein the inputs are identical, but the outputs are different ($s_A[k] \neq s_B[k]$).

As explained above, training the inverse model (302) using this data results in the same inputs possibly generating the wrong predicted output (e.g., $s_A[k]_{calibrated\ (predicted)}$ vs. $s_B[k]_{calibrated\ (predicted)}$), thereby reducing the accuracy of prediction.

However, by re-organizing the inputs and outputs in the training data, it is recognized that a unique dataset is now generated, in accordance with postulation (2):

(a) inputs($s_A[k]_{calibrated}$ AND $p[k]$) → output
    ($s[k]_{un\text{-}calibrated}$);

and (b) input($s_B[k]_{calibrated}$ AND $p[k]$) → output
    ($s[k]_{un\text{-}calibrated}$)     Postulation (2)

In postulation (2), the calibrated AP values ($s_A[k]$ and $s_B[k]$) are now the model inputs, while the un-calibrated/measured AP value ($s[k]_{un\text{-}calibrated}$) is the model output.

Accordingly, in postulation (2), the inputs are different, but the output is the same. In turn, this does not violate the rule of expected uniqueness. In particular, unlike in postulation (1), in postulation (2), the model is trained to always generate the correct output (i.e., despite the output being the same), notwithstanding the existence of non-unique datasets. More generally, the postulation (2) is able to convert a non-unique dataset into a unique dataset.

In view of this, in FIG. 3B, the forward model (304) is trained in accordance with postulation (2), to receive as inputs: (i) a calibrated AP value ($s[k]_{calibrated}$); and (ii) time-paired accuracy-enhancing parameters (p[k]), and in turn, generate an output prediction for the measured, un-calibrated AP sensor value ($s[k]_{un\text{-}calibrated\ (predicted)}$).

Stated in an alternate way, the forward model (304) is trained to receive a calibrated AP value (e.g., true AP value), and predict a measured/un-calibrated AP sensor value that would otherwise result (e.g., map) to the calibrated AP value. The forward prediction model, therefore, operates in reverse dynamic to the inverse model (302) (FIG. 3A).

It will be understood that the forward model (304) may have an architecture in the form of an artificial neural network (ANN), a regression model including a linear and/or non-linear regression model, decision-tree model, support-vector machine classification models, or Bayesian or belief network model, among others.

IV. Example Method of Applying Trained Forward Model with an Optimization Model It will now be appreciated that, once the forward calibration model (304) is trained, it may not always be possible to use the forward model (304) as a standalone model. That is, the forward model (304) cannot be used in the usual manner to: (i) receive a measured, un-calibrated sensor AP reading ($s[k]_{un\text{-}calibrated}$), and (ii) predict a corresponding, calibrated AP value ($s[k]_{calibrated}$). This is because the inputs and outputs of the forward model (304) are reversed (FIG. 3B). Therefore, the forward model (304) alone, is of little practical use in FIG. 1, where the objective is to predict the unknown calibrated AP values ($s[k]_{calibrated}$).

Figure 4A:
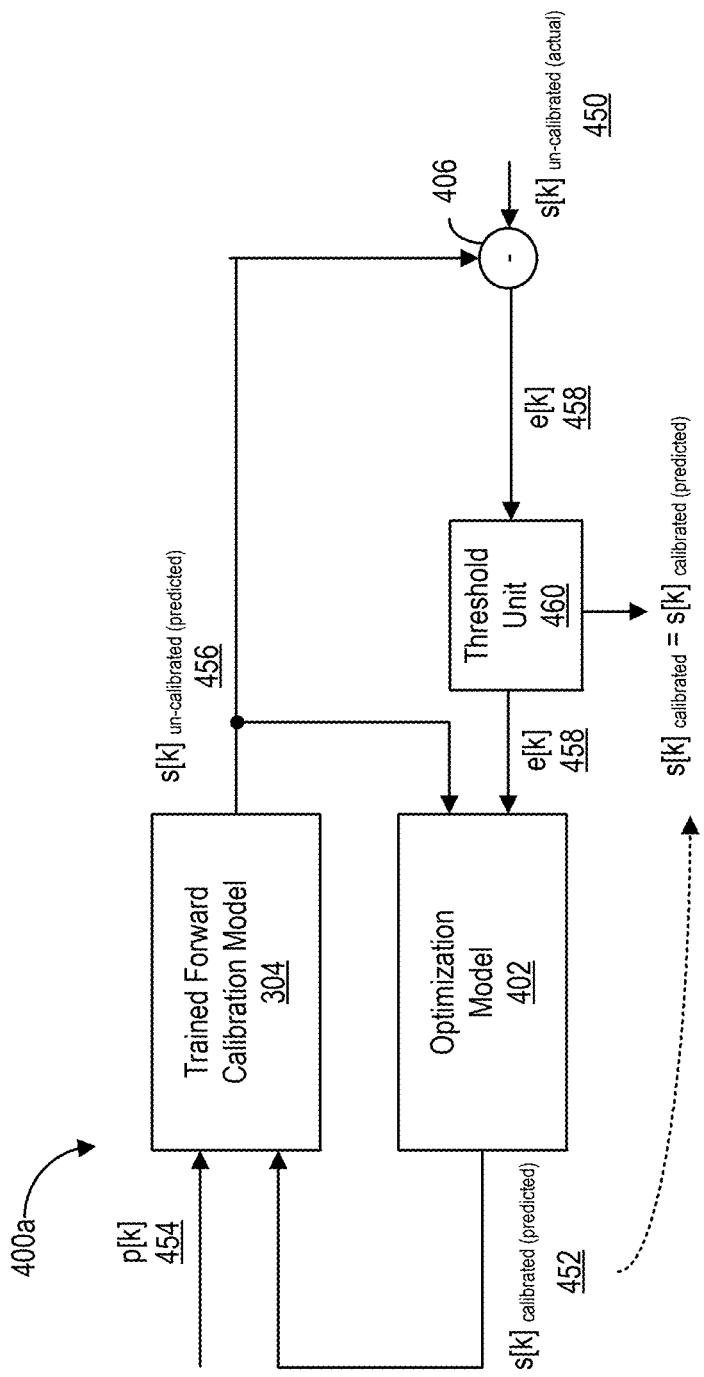
FIG. 4A is a simplified block diagram for an example architecture flow for using a trained forward calibration model, in conjunction with an optimization model, to predict calibrated ambient parameter (AP) values.

To that end, FIG. 4A illustrates a simplified block diagram for an architecture (400a) for using a trained forward calibration model to generate predictions for calibrated AP values. More generally, architecture (400a) exemplifies how the trained forward model is deployed in practice.

As exemplified, the trained forward model (304) is coupled to an optimization model (402). The forward model (304) and the optimization model (402) operate together, and iterate, to generate the predicted calibrated AP value ($s[k]_{calibrated\ (predicted)}$) from a measured, un-calibrated AP value ($s[k]_{un\text{-}calibrated}$).

As non-limiting examples, the forward calibration model may have an architecture in the form of an artificial neural network (ANN), a regression model including a linear and/or non-linear regression model, decision-tree model, support-vector machine classification models, or Bayesian or belief network model, among others.

Figure 5A:
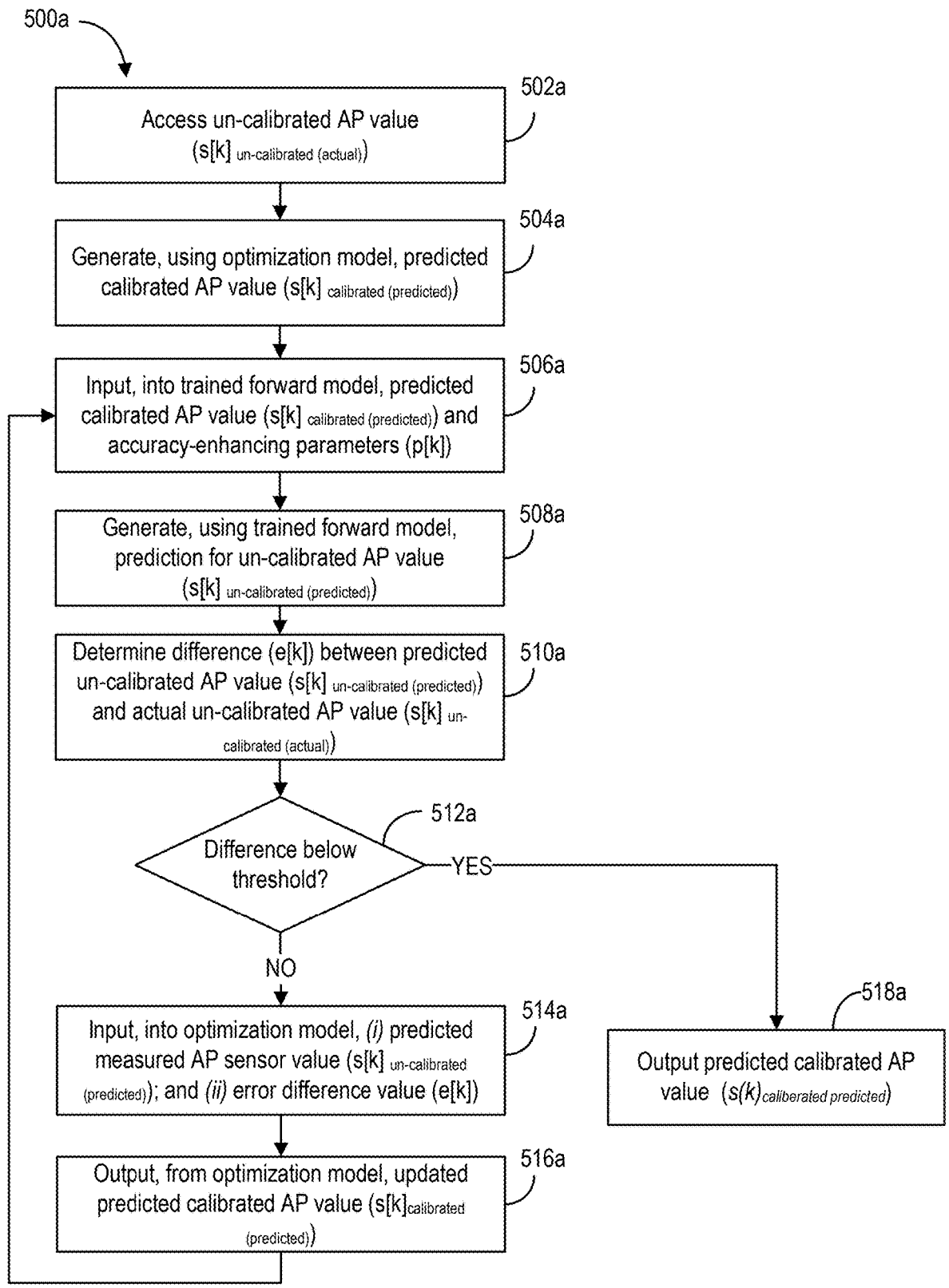
FIG. 5A is a process flow for an example method for using a trained forward calibration model to generate calibrated AP values.

FIG. 5A shows a process flow for an example method (500a) for using (e.g., operating) the combined forward model (304) and optimization model (402) to predict calibrated AP values. The discussion below is made with concurrent reference to the architecture flow (400a), in FIG. 4A.

Method (500a) may be executed by one or more of the server processor (1002) (FIG. 10) and/or DAS processor (902) (FIG. 9).

At (502a), an un-calibrated AP value is accessed (e.g., received). In architecture flow (400a) (FIG. 4A), the un-calibrated AP value, at a time step k, is expressed by the notation ($s[k]_{un\text{-}calibrated\ (actual)}$) (450).

In some examples, the un-calibrated AP value is received from an AP sensor on the data acquisition system (106), mounted on mobile platform (102). For example, at a time step k, an AP sensor monitors and records a corresponding AP value. In other examples, the un-calibrated AP value is previously measured, and retrieved from memory storage.

As explained, in the initial iteration of method (500a), the un-calibrated AP value ($s[k]_{un\text{-}calibrated\ (actual)}$) is not immediately used, and is cached (or stored) in memory.

At (504a), the optimization model (402) (FIG. 4A) generates a prediction for a calibrated AP value, corresponding to the un-calibrated AP value.

In architecture flow (400a) (FIG. 4A), the prediction by the optimization model (402) is expressed by the notation ($s[k]_{calibrated\ (predicted)}$) (452).

In the initial iteration of method (500a), any suitable value is selected as the initial prediction. In some examples, the initial prediction is the calibrated AP value, from a previous iteration of method (500a), e.g., at time step k−1.

At (506a), the predicted calibrated AP value ($s[k]_{calibrated\ (predicted)}$)—generated by the optimization model (402), at (504a)—is fed as an input into the trained forward model (304).

The forward model (304) also receives time-paired, accuracy-enhancing parameters (p[k]) (454) (FIG. 4A), also captured at the same time step k, and which can be aggregated into a vector (p[k]).

To that end, act (506a) is expressed in FIG. 4A by the two input arrows, into the trained forward model (304).

At (508a), the trained forward model (302) analyzes the inputs ($s[k]_{calibrated\ (predicted)}$) and (p[k]), and generates a prediction for the un-calibrated AP value ($s[k]_{un\text{-}calibrated\ (predicted)}$) (456).

That is, the forward model (402) operates in a "reverse" manner to predict the probable (or likely) un-calibrated AP value (456), that would otherwise map to (e.g., result from) the inputs (s[k]$_{calibrated\ (predicted)}$) and (p[k]).

At (510*a*), the difference is determined between: (i) the predicted un-calibrated AP value (s[k]$_{un\text{-}calibrated\ (predicted)}$) (456), as generated by the forward model (402); and (ii) the actual (e.g., true measured) un-calibrated AP value (s[k]$_{un\text{-}calibrated\ (actual)}$) (450), as identified at (502*a*). As shown in FIG. 4A, this is exemplified by the difference operator (406), and resulting in a difference or error value (e[k]) (458).

To this end, is not necessary that the error value (e[k]) (458) is always determined as the difference between (s[k]$_{un\text{-}calibrated\ (predicted)}$) (456) and (s[k]$_{un\text{-}calibrated}$(actual)) (450). That is, any other operator(s) (406) can be used to generate the error value (e[k]) (458). In some examples, in addition to or in the alternative of determining, an error value (e[k]), it is possible to also determine a similarity value.

At (512*a*), it is determined whether the difference value (e[k]) (458) is below a pre-determined threshold. For example, this is expressed by a threshold unit (460), in FIG. 4A.

If not, then at (514*a*), the optimization model (402) receives the error value (e[k]) (458), as well as the predicted un-calibrated AP value (s[k]$_{un\text{-}calibrated\ (predicted)}$) (456).

The optimization model (402) then operates to minimize the error value (e[k]), and generate an updated (or new) prediction for the calibrated AP value (s[k]$_{calibrated\ (predicted)}$) (452) (e.g., an updated predicted calibrated AP value).

In some examples, it is possible that the optimization model (402) receives the actual, un-calibrated AP value (s[k]$_{un\text{-}calibrated\ (actual)}$) (450) as a direct input. This can be in addition to, or in alternative of, receiving the error value (e[k]) (458) and/or the predicted, un-calibrated AP value (s[k]$_{un\text{-}calibrated\ (predicted)}$) (456). In still other examples, the optimization model (402) can only receive the error value (e[k])), and may generate predictions only on this basis.

Method (500*a*) then loops back to act (506*a*), and iterates, such that the updated predicted calibrated AP value (s[k]$_{calibrated\ (predicted)}$) (452) is fed back into the forward model (304), along with the same accuracy-enhancing parameters (p[k]). This, in turn, results in a new or updated, predicted un-calibrated AP value (s[k]$_{un\text{-}calibrated\ (predicted)}$) (456).

More generally, method (500*a*) continues to iterate until it is determined that the error value (e[k]) is below the pre-determined threshold (at (512*a*)). If so, then it is determined that the optimization model (402) has located (e.g., identified) a predicted calibrated AP value (s[k]$_{calibrated\ (predicted)}$) (452) that, when fed into the trained forward model (304)—causes the forward model (304) to generate a predicted un-calibrated AP value (s[k]$_{un\text{-}calibrated\ (predicted)}$) (456) identical (or nearly identical) to the actual (measured) un-calibrated AP value (s[k]$_{un\text{-}calibrated\ (actual)}$) (450). If this is the case, then method (500*a*) has now identified the correct inputs into the forward model (304), that result in the correct output from the forward model (FIG. 3B).

In turn, at (518*a*), the system outputs the predicted calibrated AP value (s[k]$_{calibrated\ (predicted)}$) (452)—from the most recent iteration of method (500*a*)—as the calibrated AP value. This is exemplified by the dotted arrow in FIG. 4A.

Method (500*a*) can iterate for each un-calibrated AP value received at a different timestep kΔt (k=0, 1, 2, . . . . N) to generate corresponding calibrated AP value at that time step.

In some examples, between different iterations of method (500*a*) at different time steps—a trust region method is used. The trust region method may limit the range of the optimal solutions to the optimization problem, given that s[k]$_{calibrated\ (predicted)}$ and s[k−1]$_{calibrated\ (predicted)}$, are not expected to be very different if time step (Δt) is small enough. However, if the values are different then, in some examples, s[k]$_{calibrated\ (predicted)}$ may be selected to be a predefined value (e.g., a value from a lookup table). In other examples, a previous calibrated predicted value can be used to extrapolate/interpolate the value of s[k]$_{calibrated\ (predicted)}$.

Figure 4B:
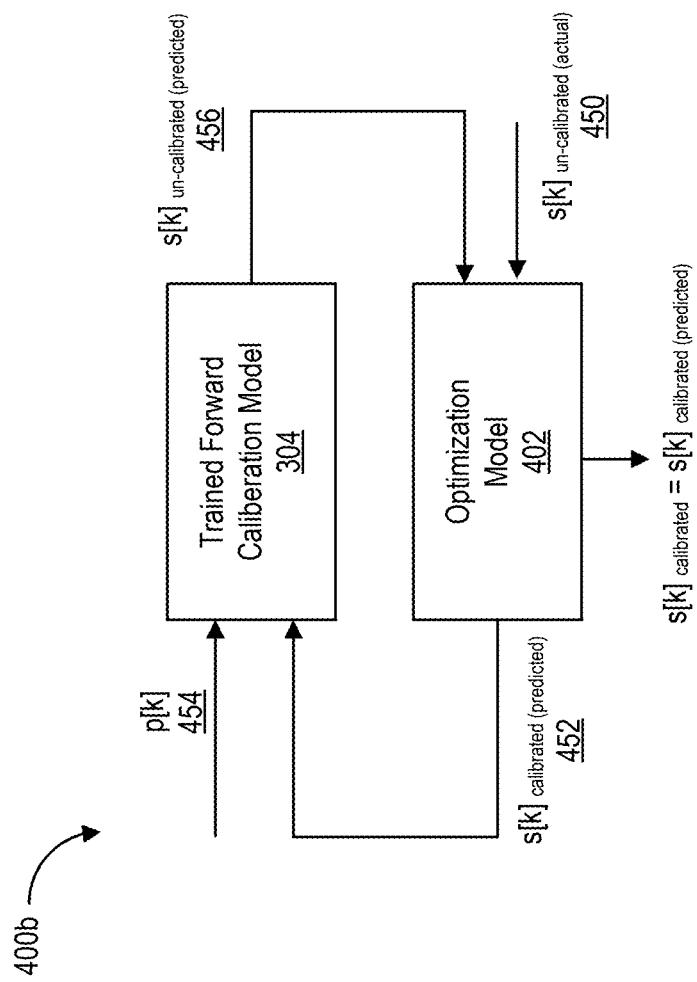
FIG. 4B is a simplified block diagram for another example architecture flow for using a trained forward calibration model, in conjunction with an optimization model, to predict calibrated AP values.

FIG. 4B shows another example architecture flow (400*b*), using both the trained forward model (304) and the optimization model (402).

The architecture flow (400*b*) is generally analogous to the flow (400*a*), with the exception that the operator (406) and threshold units (460) are removed. In this example, these functions are directly integrated into the optimization model (402). Accordingly, the predicted calibrated and actual un-calibrated AP values (450), (456) are fed directly into the optimization model (402). The optimization model (402) analyzes the inputs directly to generate a predicted calibrated AP value (s[k]$_{calibrated\ (predicted)}$) (452).

To that end, if the optimization model (402) determines that the difference between the (s[k]$_{un\text{-}calibrated\ (predicted)}$) (456) and (s[k]$_{un\text{-}calibrated\ (actual)}$) (450) is below a pre-determined threshold, then it outputs the (s[k]$_{calibrated\ (predicted)}$) (452)—from the most recent iteration—as the calibrated AP value (s[k]$_{calibrated}$).

Accordingly, in this example, method (500*a*) does not include acts (510*a*) and (512*a*). Further, act (514*a*) involves inputting the following into the optimization model (402): (i) the predicted calibrated AP value (s[k]$_{calibrated\ (predicted)}$) (452); and (ii) actual un-calibrated AP value (s[k]$_{un\text{-}calibrated\ (actual)}$) (450). The optimization model may then preform the functions of acts (510*a*), (512*a*) and (518*a*).

In some examples, architecture flows (400*a*), (400*b*) and method (500*a*) are performed in real-time or near real-time.

In at least one example, the trained forward calibration model (304) can be configured for single or multiple point extraction. In single point extraction, a single input (s[k]$_{calibrated\ (predicted)}$) is mapped to a single output (s[k]$_{un\text{-}calibrated\ (predicted)}$) by the model.

In multiple point extraction, there may be multiple concurrent inputs (e.g., a vector) of s[k]$_{calibrated\ (predicted)}$ values. For example, s$_1$[k]$_{calibrated\ (predicted)}$, s$_2$[k]$_{calibrated\ (predicted)}$, s$_3$[k]$_{calibrated\ (predicted)}$ and so forth.

The model (304) may then map each of these inputs to corresponding unique outputs, e.g., to generate a vector of outputs. For example, the output vector can include s$_1$[k]$_{un\text{-}calibrated\ (predicted)}$, s$_2$[k]$_{un\text{-}calibrated\ (predicted)}$, s$_3$[k]$_{un\text{-}calibrated\ (predicted)}$ and so forth. This multiple point extraction mapping is performed with a view to minimizing Equation (1):

$$\sum_{i=-N}^{N} \left( ANN\left(s_i[k]_{calibrated(predicted)}, p_i[k]\right) - s_i[k]_{calibrated(predicted)} \right)^2 \quad (1)$$

The vector of outputs of outputs of s$_i$[k]$_{un\text{-}calibrated\ (predicted)}$ can be fed concurrently, or one-by-one into the optimization model (402). At least one appreciated advantage of the multipoint extraction is that the forward calibration model (304) is more likely to produce unique mappings when receiving the inputs all at once, i.e., such that each input is mapped to a non-overlapping and unique outputs within the set.

In some examples, the system (400a), (400b) can also include multiple trained forward calibration models, whereby some or all of the models are configured for single point or multiple point extraction, and being coupled to the same optimization model (402).

Figure 2:
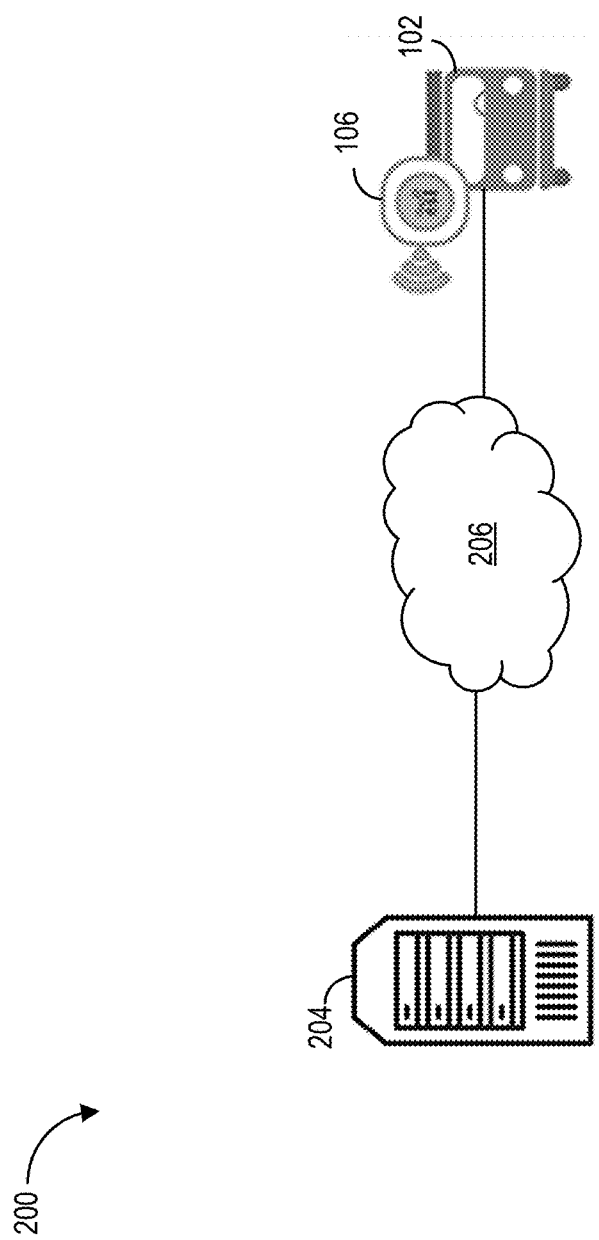
FIG. 2 is an example system for using forward calibration models to generate calibrated values for ambient air parameters.

V. Example System for Applying Trained Forward Calibration Model(s) and Optimization Model FIG. 2 is an example system (200) for using (e.g., applying and/or deploying) the trained forward calibration models and optimization model, to generate calibrated ambient parameters (AP) values, in accordance with the teachings herein.

In some examples, system (200) is used for implementing (e.g., preforming) method (500a) (FIG. 5A), and the architecture flows (400a), (400b), as described above.

As shown, the system (200) includes the DAS (106). While only a single DAS (106) is illustrated, in other examples, any number of DASs (106) are included in system (200).

In this example, DAS (106) is mounted to a mobile platform (102). In other examples, the DAS (106) is stationary, e.g., fixed to a stationary object.

DAS (106) may be coupled to a computer server (204), via a communication network (206). Accordingly, server computer (204) may be in a server-client relationship with each DAS (106). In some examples, server (204) is a cloud server.

Figure 10:
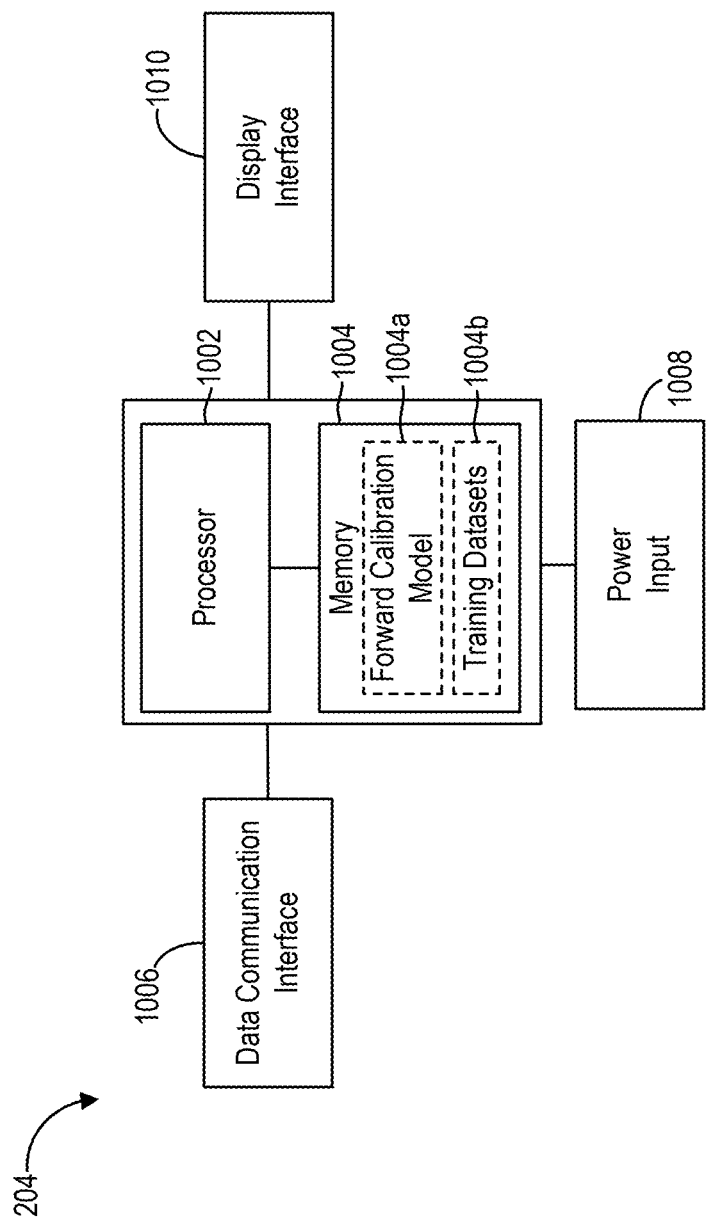
FIG. 10 is a simplified hardware/software block diagram of an example computer server.

As explained herein, with reference to FIG. 10, server (204) may include a processor (1002) coupled to a memory (1004), as well as one or more of a data communication interface (1006), power input (1008) and display interface (1010).

In some examples, server (204) can host the trained forward calibration model (304), as well as the optimization model (402). For example, these can be stored on a server memory (see e.g., (1004a) and (1004b) in FIG. 10).

In these examples, via communication network (206)—server (204) can access (e.g., receive and/or request) sensor data generated by DAS sensors, located in each DAS (106) (e.g., as represented by the connecting lines in FIG. 2).

The DAS sensor data may include un-calibrated, measured AP values. The server processor (1002) then executes the forward model (304) and optimization model (402), as described in FIG. 5A, to generate the corresponding, calibrated AP values. The calibrated AP values are stored on the server (204), or otherwise transmitted back to the DAS (106), or any other suitable external device.

It is also possible that the server (204), in-fact, hosts multiple trained forward models (304). For example, server (204) can host different models, which are each specifically trained to calibrate different AP types. For instance, a first forward model may be trained to calibrate $CO_2$ data, while a second forward model may be trained to calibrate NO data. These are referred to herein as "AP-specific forward models".

In these examples, after receiving the un-calibrated AP values from DAS (106)—server (204) can identify the correct "AP-specific forward model" (304) associated with the data, and execute that model, in conjunction with the optimization model (402), to generate a calibrated AP value.

It is also possible that server (204) stores "sensor-specific forward models" (304). These models are trained to calibrate data for specific physical AP sensors. For example, a first "sensor-specific" model is trained to calibrate data from a first $CO_2$ sensor, while a second "sensor-specific" model is trained to calibrate data from a second $CO_2$ sensor.

Accordingly, in these examples, after receiving the un-calibrated AP values from DAS (106)—server (204) can identify the correct "sensor-specific forward model" (304) associated with the sensor generating the data. Server (204) can then execute that model, in conjunction with the optimization model (402), to generate a calibrated AP value.

To that end, various data communications methods are employable to transmit sensor data, from a DAS (106) to server (204).

For example, the DAS (106) may wirelessly transmit sensor data, via the communications network (206), to a memory of a cloud database (208), which stores the sensor data so that it can be accessed subsequently by server (204).

In other examples, the DAS (106) may directly transmit some, or all, of the sensor data via the communications network (206) to a memory that is local to server (204).

In still other examples, the computer server (204) may be physically connected to the DAS (106), and further, the DAS (106) may store some or all of the sensor data to a memory that is local in the respective system or unit, so that it may be processed by a processor that is local to the system or unit, in an "offline mode" without the need for a communications network.

Communication network (206) can be an internet, or intranet network. In some examples, network (206) may be connected to the internet. Typically, the connection between network (206) and the internet may be made via a firewall server (not shown). In some cases, there may be multiple links or firewalls, or both, between network (206) and the Internet. Some organizations may operate multiple networks (206) or virtual networks (206), which can be internet-worked or isolated. These have been omitted for ease of illustration, however, it will be understood that the teachings herein can be applied to such systems. Network (206) may be constructed from one or more computer network technologies, such as IEEE 802.3 (Ethernet), IEEE 802.11 and similar technologies.

In some examples, the trained forward models (302) and optimization model (402) are hosted directly on the DAS (106). For instance, these can be stored on the DAS memory (904) and executed by the DAS processor (902). In these cases, the DAS (106) can host "AP-specific forward models" and/or "sensor-specific forward models". Accordingly, the system (200) may not necessarily require the server (204), and the methods are executed directly by the DAS processor (902) (FIG. 9).

VI. Example Overall Method for Training and Deploying Forward Calibration Model

Figure 5B:
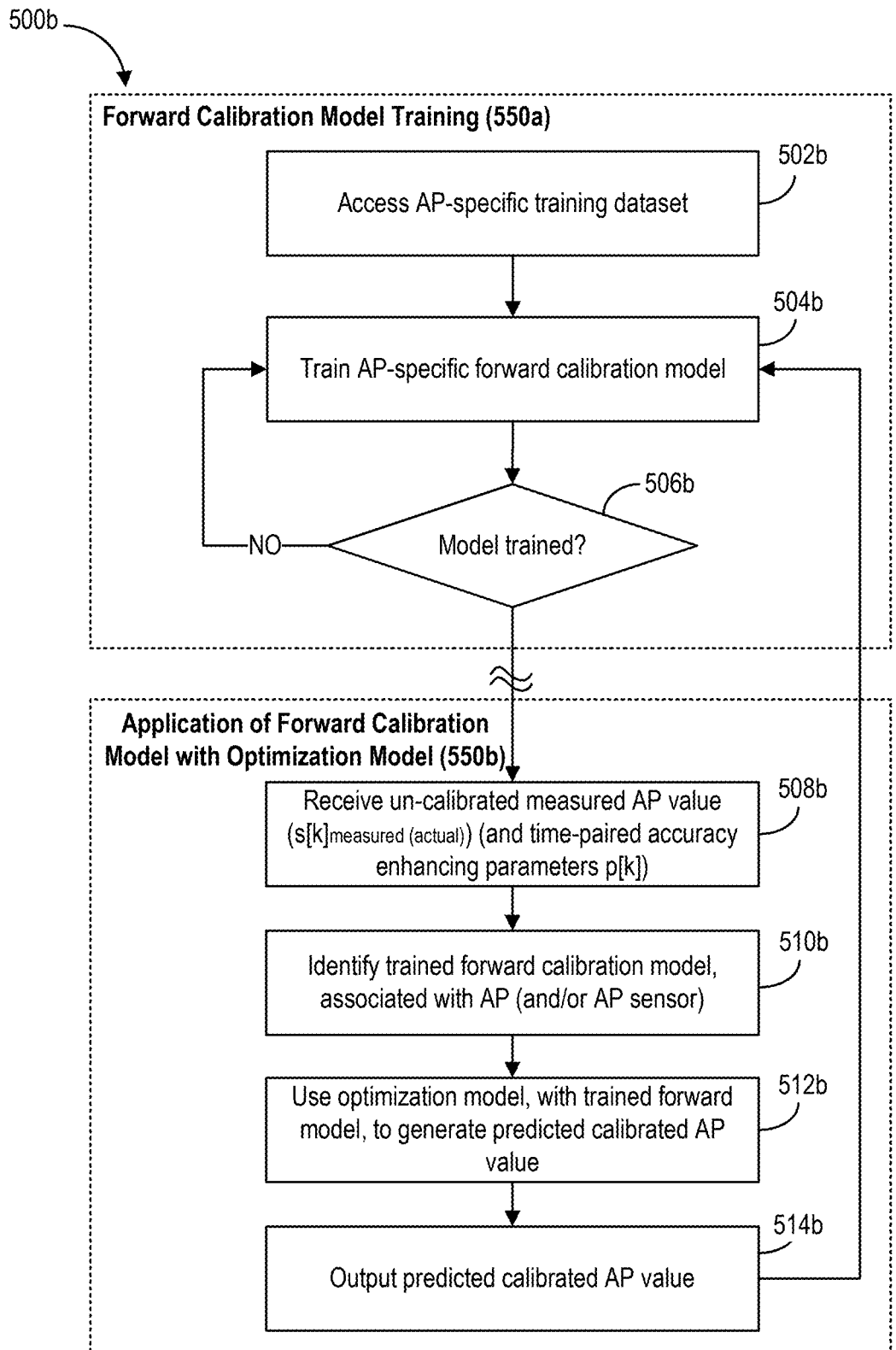
FIG. 5B is a process flow for an example overall method for training a forward calibration model, and further, applying the trained forward calibration model to newly measured AP values.

FIG. 5B shows a process flow for an example overall method (500b) for training a forward calibration model, and further, applying the trained forward calibration model (along with the optimization model) to new measured, un-calibrated AP values.

Method (500b) can be executed by the processor (1002) of server (204) (FIG. 10). In other examples, method (500b) is executed locally, e.g., on the processor (902) of the data acquisition system (DAS) (106).

At a broad level, method (500b) includes two sub-process flows: (i) initially, training the forward calibration model (550a); and (ii) subsequently, applying the trained forward calibration model, in conjunction with the optimization model (550b). In some examples, the training (550a) is continuously performed, even as the trained model is being applied (550b).

Considering first the training of the forward calibration model (550a):

At (502b), the system accesses a training dataset, used for training the forward calibration model (304). The training dataset can include one or more dataset points.

In some examples, each training dataset point includes three values: (i) an un-calibrated AP sensor value ($s[k]_{un\text{-}calibrated}$), measured at time step k; (ii) a time-paired, calibrated AP sensor value ($s[k]_{calibrated}$), corresponding to the un-calibrated AP value; and (iii) one or more time-paired, accuracy-enhancing parameters p[k].

The training dataset can include a plurality of these dataset points, acquired at time k$\Delta$t, wherein $\Delta$t is the sampling time step, and k=0, 1, 2, etc.

At (504b), the forward calibration model is then trained to map ($s[k]_{calibrated}$) and (p[k]), to different ($s[k]_{un\text{-}calibrated}$) (FIG. 3B).

In this example, a simplified case is assumed whereby all training dataset points relate to the same AP (e.g., CO concentration). That is, acts (502b)-(506b) are regarded as exemplifying the training of a single AP-specific forward calibration model. However, acts (502b)-(506b) can also be used to separately train any number of AP-specific calibration models, using any number of training datasets associated with a specific AP (e.g., AP-specific training data).

Training algorithms are known to persons skilled in the art of machine learning. The selection of a training algorithm that is suitable for a particular machine learning model is within the skill of persons of ordinary skill in the art. In embodiments, the machine learning model and training algorithms may be implemented using available software environments or platforms, with non-limiting examples including Google Colaboratory™ (also known as Colab™) (Google Research), Juptyer™ (also known as IPython™) (Project Jupyter), and Anaconda™ (Anaconda, Inc.; Austin, TX, USA).

At (506b), a determination is made as to whether the forward calibration model is sufficiently trained. In some examples, the forward calibration model is trained once a loss function ($e_{loss}[k]$), in Equations (2) or (3), described further below, is determined to be below a pre-determined threshold.

If the calibration model is not trained, then the method (500b) returns to act (504b), to continue model training. For example, the model can be trained using new, or additional training dataset points.

To that end, the present disclosure is not limited by the number of training dataset points used for training of the forward calibration model, which may depend on factors such as the type of measured APs, and a particular sample of the training values. As an example, tens of thousands of training values may be used for training of an AP-specific calibration model.

Otherwise, the trained calibration model is output. In some examples, the trained forward calibration model is stored on memory (904) of the server computer (204) for "offline" use (FIG. 9).

In other examples, the trained forward calibration model is transmitted to external computing systems. For example, the trained calibration model is transmitted, stored and hosted directly on any data acquisition system (DAS) (106). In this manner, the trained forward calibration model is directly accessible by the DAS (106). As explained herein, the model can also be stored on any number of reference units (602).

As noted previously, acts (502b)-(506b) can iterate to separately generate one or more AP-specific forward calibrations models. For instance, new AP-specific training data can be used to train, by way of non-limiting examples: (i) an $NO_2$-specific forward calibrating model; (ii) a $CO_2$-specific forward calibrating model, etc. By generating AP-specific models, the models are more specifically trained to calibrate an associated AP, thereby generating more accurate results for that AP.

It is also possible that acts (502b)-(506b) iterate to separately train and generate one or more "sensor-specific" forward calibration models. For example, a different model is trained for each individual physical AP sensor (e.g., located on a DAS). This can mean if there are multiple sensors which measure the same AP—a separate calibration model is trained for each AP sensor. Accordingly, (502b), the training data can include un-calibrated AP sensor data ($s[k]_{un\text{-}calibrated}$), generated by the specific AP sensor, for which the model is being trained for. Once the model is trained, it is used to calibrate AP values generated by that specific AP sensor. The system may then train multiple AP and sensor-specific models.

Continuing with reference to FIG. 5B, at a subsequent point in time, the trained AP-specific model (or sensor-specific model) is applied to newly measured AP values by the data acquisition system (DAS) (106).

For example, at act (508b), an input AP value is received, which is generated by a sensor of the DAS (106).

For example, in FIG. 1, the DAS (106) can generate new sensor data as it navigates again along the data collection route (104a). The generated sensor data can measure an AP value at a point along the same route (104a), or any other route. Accordingly, this new sensor data is received by the system at act (508b). In other examples, new sensor data is generated by a stationary DAS (106).

Additionally, at (508), one or more time-paired accuracy-enhancing parameters (p[k]) can also be received. The accuracy-enhancing parameters can be generated in analogous manner as act (506a), in FIG. 5A.

In examples where the trained calibration model(s) are hosted on the server (204)—the received un-calibrated AP value (508b) from DAS (106), as well as the accuracy-enhancing parameters, are received at server (204), via network (206) (FIG. 2). For example, the data acquisition system (DAS) (106) can transmit the values and parameters to the server (204), via network (206).

At (510b), the system can identify the trained AP-specific forward calibration model, that is associated with the AP value.

In cases where the memory stores multiple AP-specific models, act (510b) can further involve, initially, selecting the correct AP-specific model to apply to the input values. For example, if the un-calibrated AP value is "CO" gas (act (508b)), then the system identifies the correct trained AP-specific model associated with CO gas, and applies that model.

In further examples, where the memory stores multiple AP and "sensor-specific" models, act (510b) can further involve selecting not only the correct AP-specific model, but also the correct sensor-specific model, associated with the sensor that measured the un-calibrated AP value. For example, there may be two or more trained models for the same AP, wherein each model is trained for a different physical AP sensor.

To this end, the system can identify the correct AP-specific (and/or sensor-specific) model in various manners.

In at least one example, each AP sensor (or DAS), transmit an identifier. The identifier can be transmitted separately and/or concurrently with the measured AP data. The identifier can be unique to the sensor (e.g., a sensor ID), sensor AP type, or otherwise, unique to the DAS (106).

The system can use the identifier to determine the type of AP being monitored by that sensor, and identify the correct AP-specific model. For example, specific identifiers are assignable to sensors measuring specific APs.

In other examples, the system also uses the identifier to determine the correct sensor-specific model. For example, specific identifiers are assignable to specific physical sensors.

More generally, it is possible that an identifier can identify one or more of: (i) the type of AP monitored by the sensor; (ii) the specific physical AP sensor; and/or (iii) the DAS (106) to which the sensor is mounted.

In some examples, each AP-specific model can be stored in memory (e.g., server memory) with an associated identifier, identifying the AP associated with that model. This, in turn, facilitates the selection and mapping process at act (510b). Similarly, each sensor-specific model can be stored in memory with an associated identifier, of the specific sensor associated with that model.

At (512b), the identified trained AP-specific forward model (and/or sensor-specific model) at (510b), is used in conjunction with the optimization model (402) (FIG. 4A or 4B), to generate a predicted, calibrated AP value (s[k]$_{calibrated\ (predicted)}$) (514b). This can involve executing the process described previously, in relation to method (500a) (FIG. 5A), or any variation thereof as described herein.

At (514b), an estimated or predicted calibrated AP value is output (s[k]$_{calibrated\ (predicted)}$). In other words, the calibration model adjusts for calibration offsets in sensor data, measured by the data acquisition system (DAS) (106).

In at least one example, the calibrated AP value (514b) is output on a display interface (910) of the server (204) (FIG. 9). In other example, the calibrated AP value is stored on a memory (904) of the server (204), or a memory (1004) of the DAS (106), or a memory of the cloud database (208). The stored calibrated value can be accessed immediately, or at a future point in time for further data analysis and processing.

In some examples, the output is used to generate heat maps of the surrounding environment, and/or integrate the output with other systems (e.g., via APIs). Examples herein are not restricted to the type of output generated and/or how the output is used.

In at least one embodiment, acts (508b)-(514b) are performed in real-time, or near real-time, such as to provide real-time calibration of AP values generated by the data acquisition system (106). That is, the elapsed time from the measurement of the input value of the un-calibrated AP, at act (508b), to the output at act (514b), is practically instantaneous, being practically limited only by any latency in the communication and processing of the sensor data and output.

In some examples, acts (508b)-(514b) are performed "offline" (or otherwise, not in real-time or near real-time). For example, the un-calibrated AP values, and accuracy-enhancing parameters, may have been previously obtained. Further, they may have been previously stored on a memory of the server (204), cloud database (208) and/or data acquisition system (106). In this example, the trained calibration model retrieves the previously acquired datasets, and generates the calibrated output.

Acts (508b)-(514b) can be performed iteratively (e.g., in real-time or near real-time) as new un-calibrated measured AP values are received and may generate corresponding outputs.

Figure 5C:
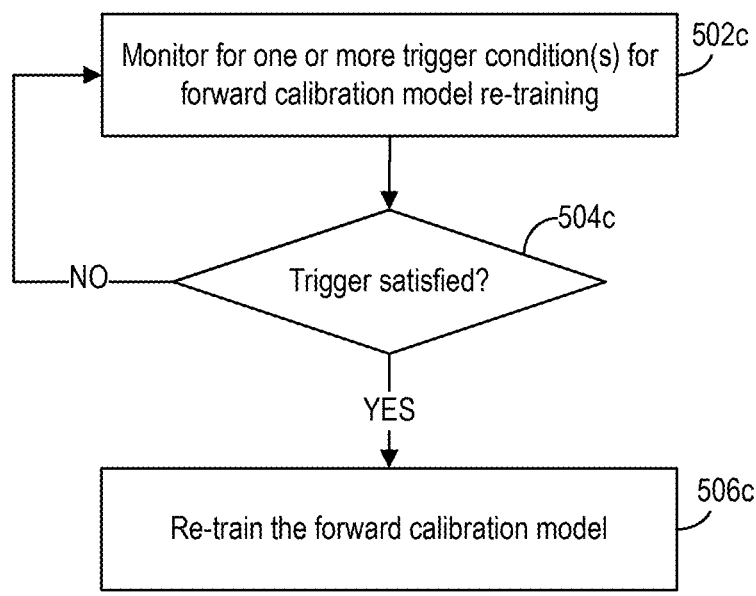
FIG. 5C shows an example method for re-training (or re-calibration) of a forward calibration model.

FIG. 5C shows an example method (500c) for re-training (or re-calibration) of a trained forward calibration model. This can refer to re-training of an AP-specific or sensor-specific forward model.

More generally, in method (500b) (FIG. 5B), once a forward calibration model is initially trained and deployed—and the method otherwise proceeds to acts (508b) to (514b)—it is possible that the trained forward calibration model continues to be trained and/or re-trained. In some examples, the model is re-trained offline, e.g., on the server (204) (FIG. 6A) and then remotely transmitted to one or more DASs (106). In other examples, the model is re-trained directly on a DAS (106).

As shown, at (502c), the system can monitor for one or more trigger conditions for re-training (or continuing) to train the forward calibration model.

In at least one example, the trigger condition corresponds to a change in an environmental condition (e.g., weather temperature, or season). For instance, while an AP-specific forward model may be trained on training data generated during a summer season, the model may require re-training to accommodate the winter season. Therefore, new training datasets may be generated during the winter season (e.g., FIG. 7), and the forward calibration model is re-trained based on the new training dataset, and re-deployed.

The change in environmental conditions can be detected, for example, based on data from one or more environmental parameter (EP) sensors (908b) (FIG. 9), user input(s) and/or based on other inputs (e.g., external weather data, time and date data, etc.).

In another example, a trigger condition may be that the DAS (106) passes within threshold proximity of a reference unit (602). For instance, as detailed below, reference units (602) can be used for generating training data, for training the forward model (see discussion for FIG. 7, below). Accordingly, when the DAS (106) passes by a reference unit (602), it can generate one or more training datapoints that can be used for re-training the model.

In these examples, the trigger condition may be that the DAS (106) simply passes by a reference unit (602), as explained below. In other cases, the trigger condition may be that the DAS (106) passes by a new reference unit (602) it has not passed-by before (or has not passed-by for a given time threshold). For example, the DAS (106) (or other system) can maintain a record of which reference units (602) the DAS (106) has previously passed by, and if a new reference unit (602) is detected, training data from that reference unit (602) can be used for re-training the forward calibration model.

In another example, the trigger condition may be that the DAS (106) is equipped with a new AP sensor (908a) (FIG. 9). For example, this can involve replacing the current $NO_2$ sensor, with a new $NO_2$ sensor from the same or a different manufacturer. In these cases, it is possible that the forward model (e.g., AP-specific and/or sensor-specific) may require re-training using new training data generated by the new sensor (see e.g., FIG. 7).

In still other examples, any other trigger condition may be monitored. For instance, it may be a temporal trigger condition (e.g., new training data requires collecting at given times/dates).

At (504c), a determination is made as to whether the trigger condition is satisfied. If not, the method can return to (502c) to continue monitoring. Otherwise, at (506c), in response to detecting the trigger condition, the system can generate and/or acquire new training data (e.g., using the process in FIG. 7), and use the training data to re-train a given forward model.

In some examples, a moving window training technique is used. More generally, as new training data is received, obtained and/or generated within a given moving time window, that data is used to iteratively train and/or re-train the model.

VII. Example System for Training of Forward Calibration Model

Figure 6A:
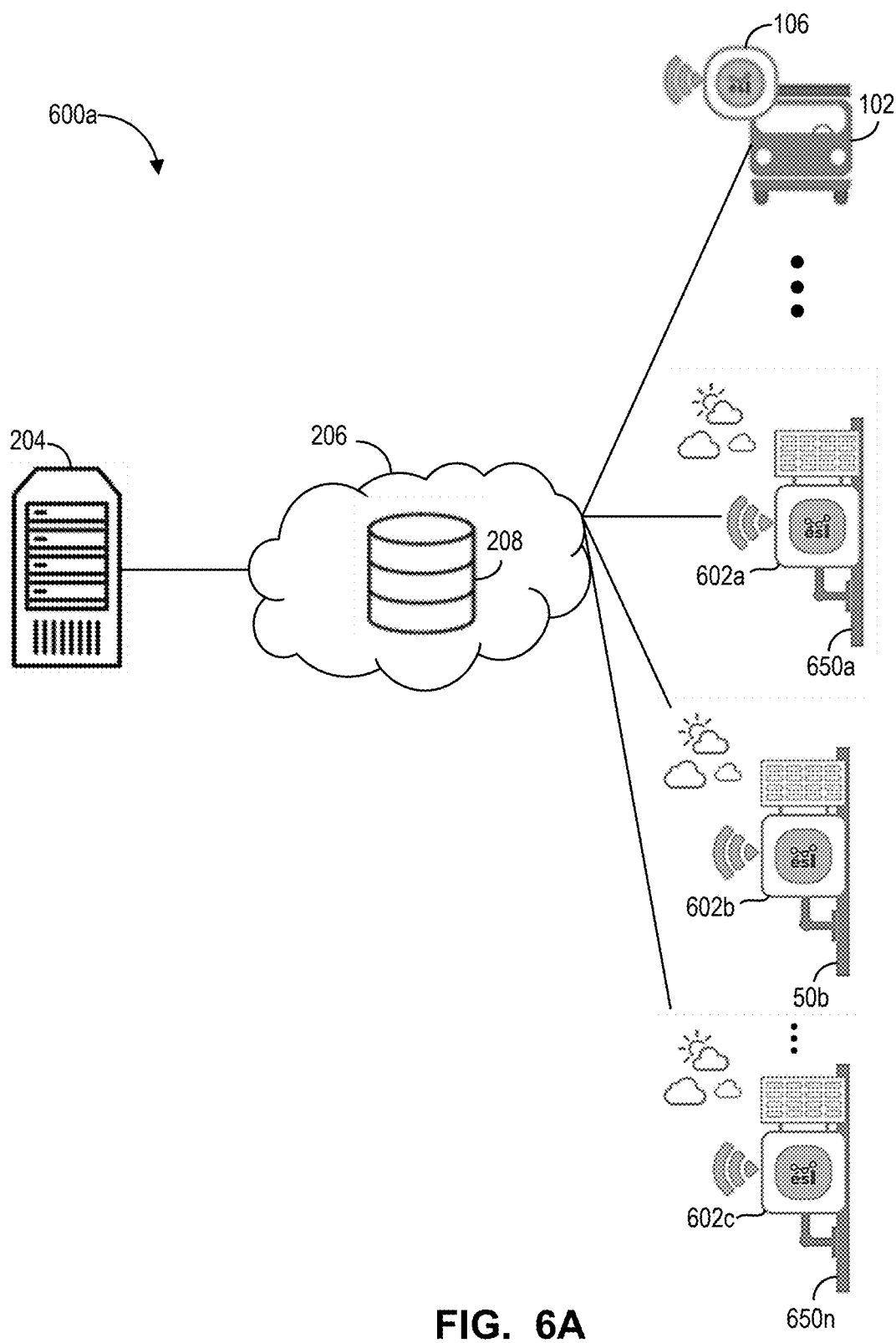
FIG. 6A is an example system for training one or more forward calibration models.

FIG. 6A illustrates an example system (600a), which can be used for generating training datasets, for training the forward calibration model (304). The system (600a) is used for generating training datasets, accessed at act (502b) (FIG. 5B).

As shown, the system (600a) can include a data acquisition system (DAS) (106) (FIG. 1) and one or more reference sensor units (602a)-(602n).

Each reference unit (602) can include one or more sensors (also referenced herein as "reference sensors"). The reference sensors are designed to measure values for various ambient parameters (APs) in air samples localized around the respective reference unit (602).

As used herein, sensor data generated by reference sensors may be referenced herein as "reference sensor data", i.e., as distinguished from data acquisition system (DAS) sensor data.

More generally, the reference units (602) are a source of more accurate sensor data, and in some examples, more accurate than the sensors included in the data acquisition system (106).

As explained, the more-accurate sensor data—generated by the reference units (602)—is used for training the forward calibration model (304). After training, the combination of the trained forward calibration model (304) and optimization model (402), are then deployed to correct the less-accurate sensor data, from the data acquisition system (106) (e.g., as described in FIG. 5A).

The reference units (602) can include, for instance, expensive high-grade sensors that generate scientifically accurate sensor readings. Reference units (602) can also include hardware used for stabilization and/or calibration of sensor data. In some examples, the reference units (602) are fixed or mobile government environmental stations.

The DAS (106) and reference sensor units (602) can couple to an external server (204), via network (206). Server (204) (FIG. 6A) can be the same, or a different server, from the one exemplified in FIG. 1.

Figure 6B:
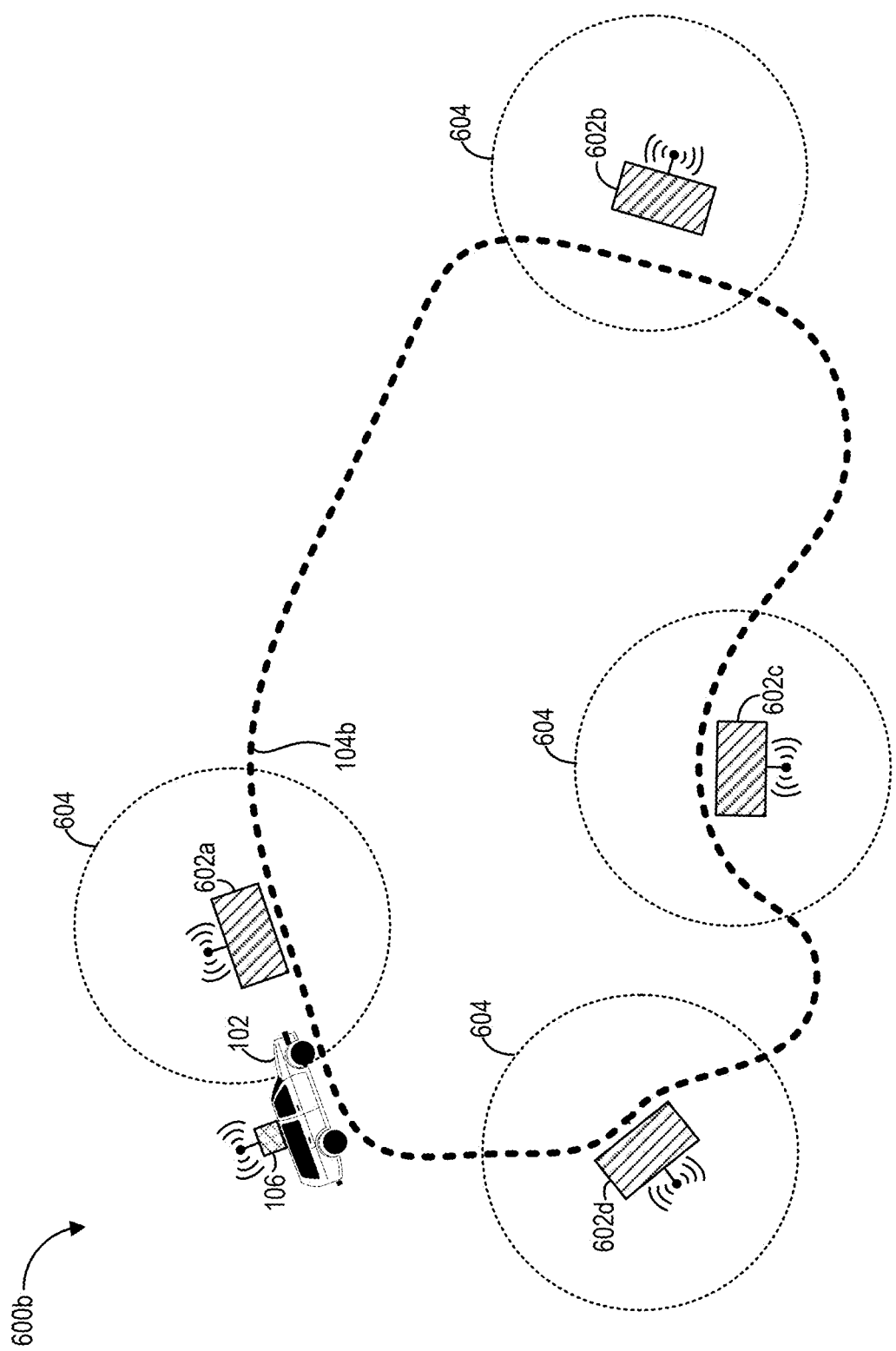
FIG. 6B is an example environment for training a forward calibration model.

Concurrent reference is now made to FIG. 6B, which exemplifies a training environment (600b), in which system (600a) can be deployed for training the forward calibration model (304).

As shown, the data acquisition system (DAS) (106) is mounted to the mobile platform (106).

As exemplified in FIGS. 6A and 6B, the reference units (602) can be stationary, and positioned at different geographic locations on, or near, data collection route (104b) of the mobile system (106). For example, each stationary unit (602) is mountable, of affixed, to various stationary structures (650a)-(650n) (e.g., a street lighting pole, or a building) (FIG. 6A) along route (104b) (FIG. 6B).

In other examples, the reference units (602) are also mobile. For example, the reference units (602) are mounted to various mobile platforms (e.g., vehicles, busses, suitcases, etc.). The training system (600a) can also include a mix of both mobile and stationary reference sensor units.

Irrespective of whether the DAS (106) and/or reference units (602) are stationary or mobile, there are time segments of overlap (e.g., geographic overlap) between the DAS (106) and the reference units (602). These overlap time segments are also known herein as "thin time-slice segments".

The thin time-slice segments generally occur when data acquisition system (DAS) (106) is within a pre-defined distance or proximity of a reference unit (602).

In some examples, a geographic boundary region (604) is defined around each reference unit (602) (FIG. 6B). Accordingly, a thin time-slice segment occurs in the time period when the DAS (106) is geographically within the boundary region (604).

The boundary region (302) can be, for example, within 0 to 50 meters around the reference unit (602). While illustrated as a circle, the boundary region (604) can have any other shape or configuration. Further, different types of boundary regions (604) can be defined around different reference units (602).

In some examples, the size (or area) of the boundary region (604) varies based on the apparent or determined level of pollution in the surrounding area. For example, if the area is more polluted, this can require higher resolution measurements, therefore a smaller boundary region is used. The significance of relying on a smaller boundary region will be explained shortly.

In an ideal case, for a given measured AP (e.g., CO concentration), the value of the AP reading from the reference sensor (602) should be substantially identical to the readings generated by the data acquisition system (DAS) sensors, during the overlap time segments (i.e., thin time-slice segments). This is because, during these time segments, both the reference and data acquisition sensors are measuring the same AP in the same air sample (e.g., within boundary region (604)).

More practically, however, the data acquisition system (DAS) sensor readings deviate from the reference sensor readings. This is owing to calibration errors affecting the data acquisition system (DAS) sensors, but not otherwise affecting the reference sensors, at least to the same degree, as discussed above. For this reason, in described embodiments, the thin time-slice segments are used to train the forward AP calibration models (304).

VIII. Example Method for Generating Training Datasets

Figure 7:
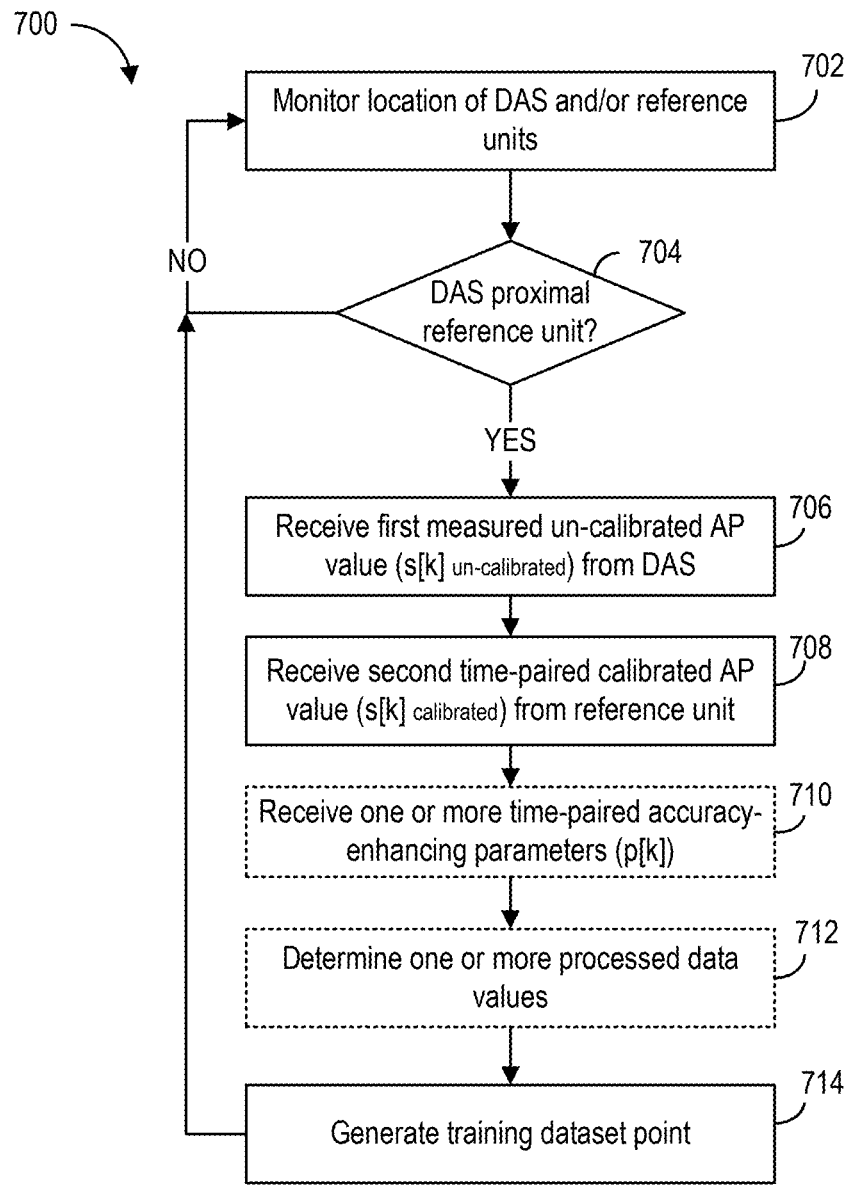
FIG. 7 is a process flow for an example method for generating training datasets, for training a forward calibration model.

FIG. 7 shows a process flow for an example method (700) for generating training datasets for training the forward calibration model (304). In some examples, method (700) is used to train the forward model (304), prior to deploying it in conjunction with the optimization model (402) (FIGS. 4A and 4B). In some examples, method (700) generates the training datasets, accessed at act (502b) (FIG. 5B).

Method (700) can be executed by processor (1002), of the computer server (204) (e.g., a cloud server). In other examples, the method (700) is executed locally, e.g., a processor (902) of the data acquisition system (106).

To this end, method (700) can be executed within the environment (600b), exemplified in FIG. 6B.

At act (702), the server (204) monitors the location of the DAS (106) and/or the reference units (602). The DAS (106) and reference unit(s) (602) can be mobile or stationary. In at least example, the server (204) monitors the position of which ever system is mobile at a given instance.

The purpose of the monitoring is to determine whether the DAS (106) is within a threshold proximity to a reference unit (602). For example, this involves determining if the DAS (106) is within the boundary region (604), associated with a reference unit (602).

At act (704), the server (204) determines if the DAS (106) is within threshold proximity of a reference unit (602) (e.g., within the boundary region (604)). If this holds true, this may satisfy a condition for generating training dataset points.

This condition corresponds to the existence of an overlap time segment (i.e., a thin time-slice segment) between the DAS (106) and reference unit (602). As explained above, the thin time-slice segments are ideal time segments for generating training dataset points, to train the calibration model.

The system can monitor proximity of the DAS (106) to a reference unit (602) in various manners. In at least one example, the monitoring is based on location data generated, and received, from one or more of the DAS (106) and the reference units (602).

For instance, with respect to monitoring position of a mobile DAS (106), the DAS (106) can generate location data using one or more of the GPS module (912) and/or a telematics systems of a vehicle (102) (FIG. 9). The location data is transmitted from DAS (106) to the server (204), automatically or upon request.

With respect to monitoring position of stationary reference units (602), the server (204) can store pre-determined geographic locations of each stationary reference unit (602).

With respect to monitoring position of mobile reference units (602), each reference unit (602) may independently communicate its own geographic location and/or route trajectory to the server (204). For example, each reference unit (602) may connect to a location sensor (e.g., GPS modules), which generates respective location data. The location data is transmitted automatically, or upon request, to the server (204). The location data is stored in association with each reference unit (602), and used to determine the position of each reference unit (602) relative to the DAS (106). In other examples, the server (204) can store a pre-determined route trajectory for each mobile reference unit (602).

Accordingly, at act (704), upon receiving location data, the server (204) can cross-reference the DAS's current location to the pre-determined locations or route trajectory of each reference unit (602).

Accordingly, if the DAS' (106) location is within a pre-determined distance of a stationary or mobile reference unit (602), the system can determine the beginning (or existence) of an overlap time segment at act (704) (i.e., wherein training dataset points can be generated.)

Continuing with reference to FIG. 7, at act (704), if the DAS (106) is not within proximity of a reference unit (602), then method (700) can return to act (702) to continue monitoring. Otherwise, if sufficient proximity is detected, the system can begin generating one or more training dataset points.

Acts (706)-(714) clarify an example process for generating a single training dataset point, for a single ambient parameter (AP) type (e.g., CO concentration). However, a similar process is used to generate different training dataset points, for other AP types, i.e., to train other AP-specific calibration models. These methods acts can also be used to generate training dataset points for different AP sensors, e.g., to train sensor-specific models.

At act (704), server (204) receives a first measured, un-calibrated AP value ($s[k]_{un\text{-}calibrated}$) from the data acquisition system (DAS) (106), which is located proximal a reference unit (602). The first measured value can relate to a target ambient parameter (AP), around which a calibration model is built. For example, this can be a measured value for CO concentration within the boundary region (604) (FIG. 6B), and at a given time index (k).

The measured AP value is acquired via DAS sensor data, generated by a relevant sensor of the DAS' sensor subsystem (908) (e.g., CO concentration sensor). The sensor data is generated, and transmitted to server (204) automatically, or otherwise, generated and transmitted upon request by the server (204).

At act (708), the server (204) also receives a second, time-paired measured, calibrated value for the target AP ($s[k]_{calibrated}$), but from the target reference sensor unit (602).

The target reference unit (602), in act (706a), is the reference unit determined to be proximal to the DAS (106), i.e., at act (704a). It is assumed that the target reference unit (602) includes sensors capable of measuring the same type of target AP measured by the DAS (106), to provide one-to-one mapping.

"Time-paired" means that the first AP value and the second AP value, are measured at the same time, or substantially the same time, such that the generated first and second AP values can be considered as representing a simultaneous state of the target AP in an air sample, in the vicinity of physically attached DAS and reference sensors (e.g., within boundary region (604)).

As explained earlier, in an ideal case, ($s[k]_{un\text{-}calibrated}$) is identical to the time-paired ($s[k]_{calibrated}$). However, these values realistically deviate due to calibration offsets affecting the DAS (106), but not the reference unit (602).

While method (700) illustrates act (706) being performed prior to act (708), in other cases, acts (706) and (708) are performed concurrently, or partially concurrently.

At act (710), in some examples, the server (204) additionally receives one or more accuracy-enhancing calibration parameter (p[k]) values, from data acquisition system (106) and/or target reference unit (602). Accuracy-enhancing parameters can enhance, or otherwise improve, the accuracy of the calibration model. These include various parameters expected to affect the calibration offset in the DAS (106).

To that end, accuracy-enhancing parameters, received at act (710)—can be time-paired with the received first and second AP values (706), (708). That is, the measured values of these parameters are obtained generally at the same time instance as the measured first and second AP values.

At act (712), in at least one example, the system can generate one or more processed data values.

For instance, this can involve processing training dataset values-received at acts (706)-(710), by normalizing these values, filtering the values (e.g., noise removal), or the like. In turn, one or more corresponding processed training values are generated.

In at least one embodiment, at act (712), generating processed data values involves determining a time-paired positive scale factor (h[k]).

The positive scale factor (h[k]) is used during training of the calibration model to place more emphasis on training values generated when the data acquisition system (106) is more proximal to the reference units (602).

The positive scale factor (h[k]) can increase, as the data acquisition system (106) is in closer proximity to a reference sensor unit (602). More generally, the positive scale factor (h[k]) can vary according to a pre-defined scale factor function, which relates the value of positive scale factor (h[k]) to distance proximity.

Figure 6C:
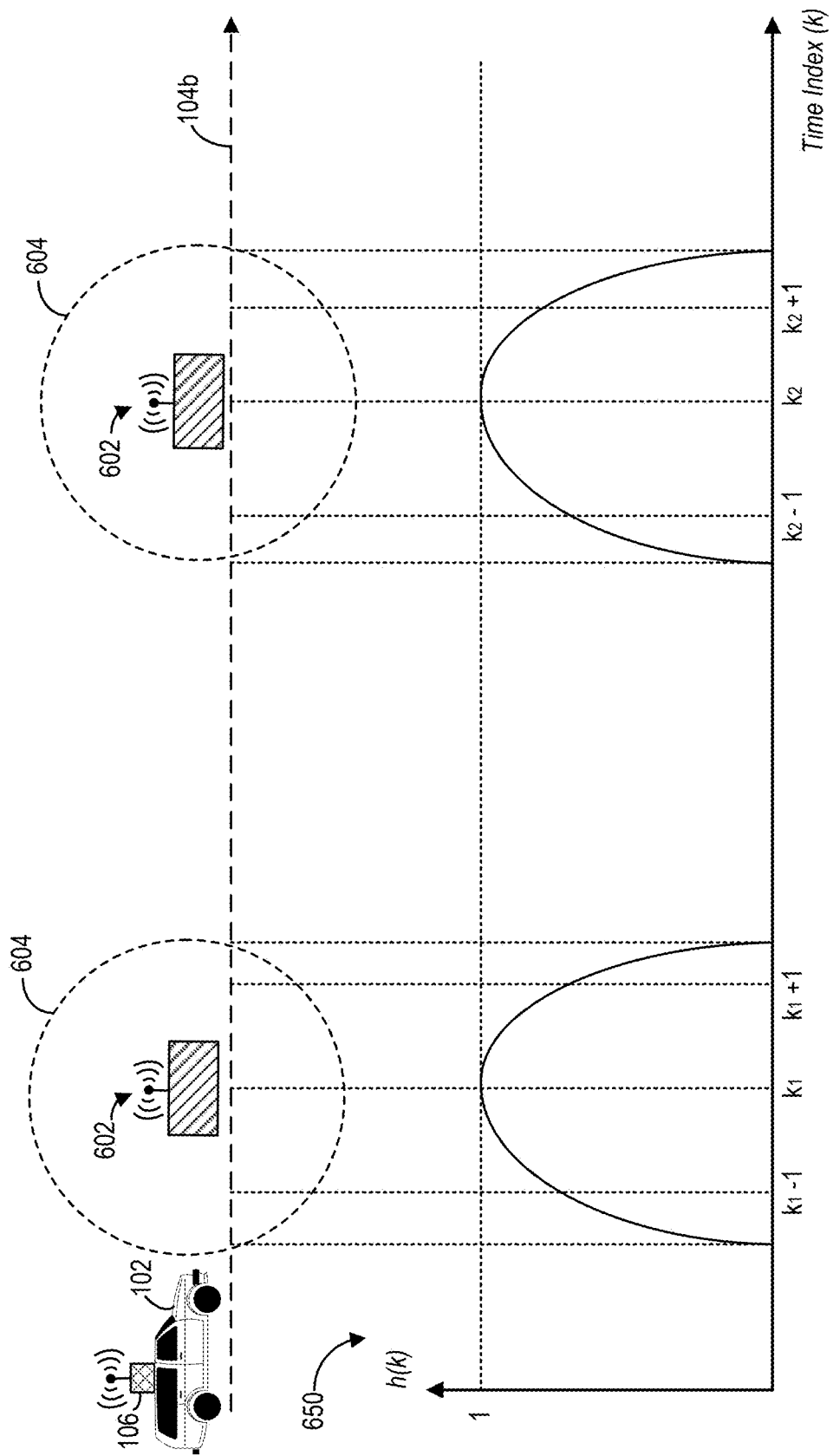
FIG. 6C is a schematic illustration of a function for determining positive scale factors for use in training a forward calibration model.

To further clarify this concept, reference is made to FIG. 6C, which illustrates two stationary reference units (602) spaced along the data collection route (104b). The boundary region (604) is demarcated around each stationary reference unit (602).

As shown in plot (650), a positive scale factor (h[k]) varies as a function of proximity of the data acquisition system (DAS) (106) to a stationary reference unit (202).

For example, when the mobile DAS (106) is outside the boundary region (604), the positive scale factor is "0". This is because the mobile and stationary sensors are not monitoring the same air sample, and therefore, training values generated by the sensors—at this position—are of minimal relevance for training the calibration model.

In contrast, within the boundary region (604), the positive scale factor (h[k]) increases until the DAS (106) is in the same position as the stationary reference unit (602). At this point, the measured training AP values, from the DAS (106) and reference unit (602), is of greatest relevance for training the calibration model. This is because the DAS (106) and the reference unit (602) are monitoring AP in a near identical air sample. Accordingly, the readings from these two systems should be expected to be near-identical.

In some examples, the scale factor (h[k]) is related to distance-between the DAS (106) and a given reference unit (602)—by a scale factor function. The scale factor function can decrease (e.g., monotonically decrease), with increased distance between the reference unit (602) and the DAS (106). In some cases, the scale factor function varies in a range between [0,1].

For example, the scale factor function can dictate that: (i) outside of a boundary region (604), the scale factor (h[k]) is zero; and (ii) within the boundary region (604), the scale factor increases (e.g., monotonically increases) as a function of more proximal distance to reference unit (602).

Within the boundary region (604) the scale factor function can also comprise any suitable function, including a linear or non-linear function. The function can decrease (e.g., monotonically decrease) as a function of distance between DAS (106) and reference unit (602). For instance, as exemplified in FIG. 7, the function is a non-linear parabolic-like function.

In some examples, the scale factor function can also be binary. For example, (i) outside of a boundary region (604), the scale factor (h[k]) is zero; and (ii) within the boundary region (604), the scale factor is one.

Determining the positive scale factor (h[k]) can involve: (i) initially, determining the difference in distance between the DAS (106) and the target reference unit (602) at time-step "k" (e.g., based on known or received location data); (ii) applying the distance to the pre-defined scale factor function, to resolve a value for the positive scale factor (h[k]).

Continuing reference to FIG. 7, at act (714), a training dataset point is generated, expressed as ($[s[k]_{calibrated} \, p[k]^T]$, $s[k]_{un-calibrated}$), wherein $s[k]_{calibrated}$ is the measured AP at the k-th time instance by a reference sensor (602); $p(k)^T$ is a transpose vector of the accuracy-enhancing calibration parameters at the time-paired k-th time instance; and $s[k]_{un-calibrated}$ is the measured AP value at the time-paired k-th time instance based on a DAS AP sensor.

In some examples, each of the variables, in the training dataset point, are not necessarily generated at the same "k" time step, but within a few steps of the "kth" time step (e.g., k±5).

In training the forward calibration model using a supervised learning method-$[s[k]_{calibrated} \, p(k)^T]$ represents the input feature space, whereas $s[k]_{un-calibrated}$ represents the target output feature. The forward calibration model is trained to approximate the mapping between the input feature space and the target output feature space, for the k-th time step.

Further, in some examples, h[k] is used during model training to place more emphasis on minimizing the errors corresponding to the time instances when the DAS (106) is closest to the reference units (602). Accordingly, the input feature space would comprise ($s[k]_{calibrated} \, p[k]^T \, h[k]$).

Subsequent to act (714), method (700) can return to act (702) to continue monitoring the position of the data acquisition system (106) and/or reference units (602).

Method (700) can iterate as many times as necessary, or desired, to generate any number of training dataset points.

For example, as the DAS (106) moves along the route (104b), method (700) can iterate at any pre-defined time or frequency interval to generate a corresponding number of training dataset points.

In this case, the multiple generated training dataset points can be said to be "time-separated". "Time-separated", as used herein, means that the plurality of training dataset points are measured at different times (e.g., k, k+1, k+2, k+n, etc.). In some examples, the training dataset points are time separated based on the sampling rate frequency of the mobile and stationery sensors.

To that end, if the data acquisition system (DAS) (106) is still within proximal range of the same reference unit (602), it can continue generating new training dataset points in association with that reference unit (602). Accordingly, during a single overlap time segment (i.e., a thin time-slice segment), it is possible for multiple training dataset points to be generated. However, these multiple training dataset points may be associated with different positive scale factors (h[k]), i.e., depending on where the DAS (106) is located within the boundary region (604) (FIG. 6C).

In other cases, the data acquisition system (DAS) (106) may move-on to within proximal range of a new target reference unit (602), and can generate new training dataset points based on the new reference unit (602).

It is also possible for a mobile DAS (106) to repeat its movement along the entirety, or any portion, of the route (104b). For example, the DAS (106) can navigate route (104b)—or any portion thereof—at a first time instance. DAS (106) can then repeat navigation of route (104b), or any portion thereof, at a later time instance. In these example, the DAS (106) re-passes by one or more of same reference units (602), and generates new training dataset points.

In at least one example, the DAS (106) is made to repeat its movement along route (104b) to accommodate for different ambient conditions. For example, the mobile system (106) is trained along route (104b) in different humidity, wind, pressure and temperature conditions. As explained, these ambient conditions are factored into model training as accuracy-enhancing parameters (p[k]). By training in different conditions, a diversified array of training dataset points is generated, which can enhance the accuracy and reliability of the calibration model.

IX. Deployment of Reference Sensors During Training and Application of Calibration Model(s)

In at least one embodiment, the reference sensor units (602) are only deployed during training of the forward calibration model. In other words, once the calibration model is trained, the reference sensor units (602) are removed from the environment, or their use otherwise neglected (e.g., as shown in FIG. 1). In this sense, the pictorial illustration in FIG. 6A exemplifies a model "training" mode, while FIG. 2 exemplifies a model "application" or "inference" mode for the system.

In other examples, the training process is iterative. In other words, the system can continue to train the forward calibration model(s) to enhance their predictive output (see e.g., method (500c) in FIG. 5C). In these cases, some or all of reference sensor units (602) are not removed, even during the inference-phase of the calibration model (e.g., during application of the calibration model).

In these examples, during the inference-phase—the reference units (602), however, can be relocated to different positions along the data collection route (104b)—or new sensors added—to generate a greater diversity of training datasets during the iterative training. Further, mobile reference units (602) can be moved along different reference trajectories.

To that end, any reference sensor configuration can be employed for forward calibration model training. For example, the configuration can include any number of fixed reference sensor units (602) located at any number of geographic locations around the route (104b). Further, the configuration can include any number of mobile reference sensor units (602). The reference sensor configuration can include reference sensor units (602) with the same, or different reference sensors for measuring any number of APs.

In at least one example, the reference sensor unit configuration is selected with a view to the desired model training. For example, fixed reference sensors are positioned around geographic points where certain types of training data can be collected. For example, if it is desired to generate more training datasets in humid or windy conditions, more stationary sensor reference units (602) are added to areas along data collection route (104b) which are more humid or windy. This allows training the system to more effectively calibrate measured AP values. By a similar token, mobile reference sensors (602) can be moved along any desired route where certain types of desired training datasets can be collected.

In some cases, different reference sensor configurations can be used with different AP-specific models.

X. Example Machine Learning Model and Training

The following is a discussion of an example machine learning architecture and training algorithm, that can be used during method (500b) (FIG. 5B).

(i.) Example Architecture for Machine Learning Model.

Figure 8A:
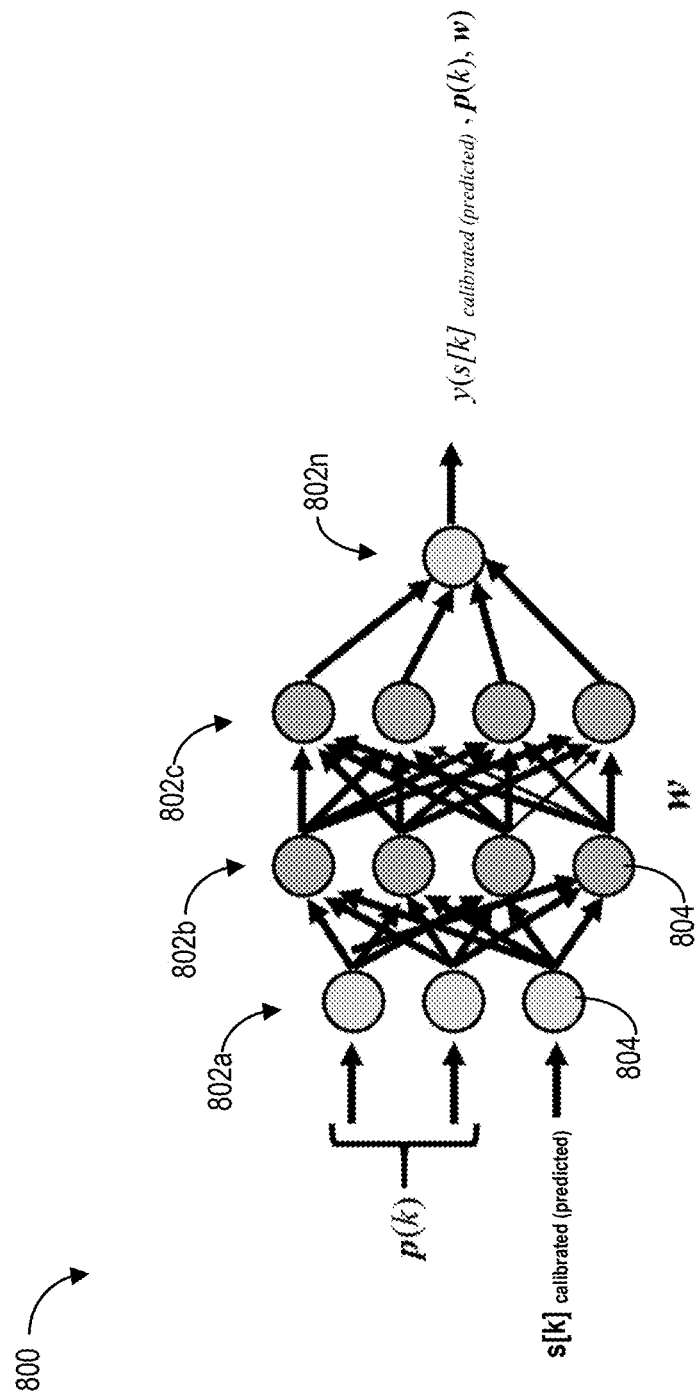
FIG. 8A is an example architecture for an artificial neural network (ANN)

FIG. 8A shows an example architecture for an ANN (800) that can be trained, to generate a trained AP-specific forward calibration model.

The ANN (800) is trained by receiving input features, corresponding to: (i) the predicted calibrated AP value $(s[k]_{calibrated\ (predicted)})$ from the optimization model (402), (ii) the accuracy-enhancing parameters (p[k]), and/or (iii) scale factor (h[k]), and the output features corresponding to the predicted un-calibrated measured AP value $(s[k]_{un\text{-}calibrated\ (predicted)})$.

The ANN (800) includes a number of "layers" (802a)-(802n), wherein each layer includes one or more neuron nodes (804). Each node (804) has an assigned node weight, such that the aggregate of the node weights is represented by the weight matrix (w).

In at least one example, the ANN (800) is composed of an input layer, five hidden layers each comprising ten hidden neuron nodes, and an output layer.

The training can occur using a stochastic gradient descent technique. In one example, an Adam (Adaptive Moment Estimation) optimization algorithm, for deep learning models, is used. Adam optimization is a stochastic gradient descent method that is based on adaptive estimation of first-order and second-order moments, as is known in the art.

An Adam optimization is known to be "computationally efficient, has little memory requirement, invariant to diagonal rescaling of gradients, and is well suited for problems that are large in terms of data/parameters" (see e.g., Diederik P. Kingma, Jimma Ba "Adam: A Method for Stochastic Optimization", ICLR 2015). Accordingly, the use of an Adam optimization algorithm is suited for small factor, low processing power applications (i.e., training on the data acquisition system). In other examples, any other Adam variant can be used, e.g., Nadam (Nesterov-accelerated Adaptive Moment Estimation), AdaMax, AMSGrad, etc.

In at least one example, the training was performed using Keras® software. The ANN inputs and outputs were scaled (i.e., mapped) to a value between 0 and 1 using a MinMax scaler to optimize training time and efficiency, i.e., and accommodate low-processing applications. In some examples, the default hyper parameters were used applying the Adam optimization algorithm using the Keras® software, namely:

Learning Rate: 0.001;
Beta 1: 0.9;
Beta 2: 0.999;
Epsilon: 1e-7; and
Amsgrad: False.

In one example, the training dataset file for training a given AP-specific forward model included 3,000 training dataset points related to that AP (e.g., generated using the method of FIG. 7), and the number of iterations to train the model was 100 iterations.

Figure 8B:
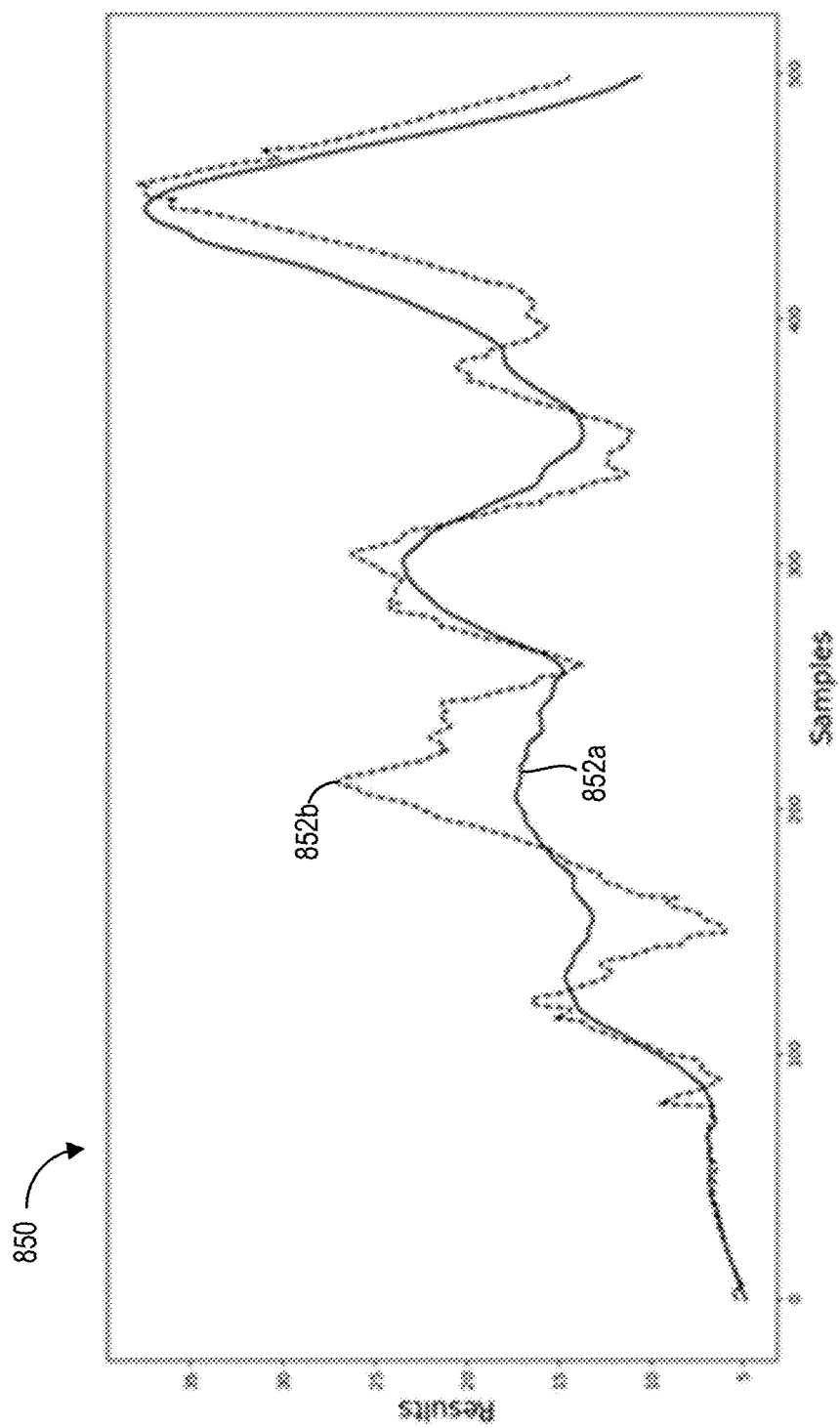
FIG. 8B is a plot of example test results.

FIG. 8B shows a plot (850b) for an example output of a trained AP-specific forward calibration model that was trained using 3,000 training dataset points over 100 iterations for $NO_2$ gas. The plot line (852a) is the AP value measured by an accurate stationary reference unit, and the plot line (852b) is the AP value predicted using a trained forward calibration model. The Y-axis is the output result of the measured gas concentration, e.g., in units of parts per billion (PPB), and the X-axis is the sample count. As shown, the two plot lines closely follow each other, thereby demonstrating the efficacy of the trained forward calibration model with optimization model. The average deviation between the plot lines (852a), (852b) is approximately 7.5 ppm.

(ii.) Example Loss Function.

As stated in method (500b), in some examples, the objective is to train the forward calibration model with a view to minimizing a loss function. If the loss function is below a pre-determined value, the model is assumed to be sufficiently trained (506b) (FIG. 5B).

More generally, the training algorithm adjusts parameters of the forward calibration model to minimize the value of a loss function, which is when the calibration model is considered to be "trained".

In some examples, the objective of training the forward calibration model is to minimize an objective function $f(w)$. The objective function $f(w)$ represents the difference between the output of the ANN, $y(s[k]_{calibrated\ (predicted)}, p(k), w)$, and the desired output $s[k]_{un-calibrated\ (actual)}$, where w is the vector of weights of the ANN.

In more detail, the desired output ($s[k]_{un-calibrated\ (actual)}$) is expressed by the measured AP value by the relevant DAS sensor at the k-th time step. The objective function is minimized when the ANN generates an estimated un-calibrated output, for the AP value that is substantially similar to the actual un-calibrated AP value, from the DAS sensor, at the k-th time step.

Among the parameters that are adjusted by minimizing the objective function $f(w)$ are the number of "layers" that make up the ANN, and the number of "neurons" or "nodes" within each layer. These parameters may be pre-assigned by an operator prior to training the ANN, and then adjusted through an iterative process.

The output of the ANN is a predicted un-calibrated AP value ($s[k]_{un-calibrated\ (predicted)}$), which is a function of: (i) the predicted calibrated AP value ($s[k]_{calibrated\ (predicted)}$) from the optimization model (402), (ii) the accuracy-enhancing parameters (p[k]), and (iii) the weight matrix w.

The training optimization problem can be expressed by Equation (2):

$$w^* = \arg\min f(w) \quad (2)$$

where the objective function aims at optimizing the weights (w*) to achieve the least possible value of all the errors $e_{loss}[k]$ as expressed by Equation (3):

$$e_{loss}[k] = y(s[k]_{calibrated(predicted)}, p(k), w) - s[k]_{un-calibrated(actual)}, k \in K \quad (3)$$

where K is the set of time indexes corresponding to the time instance (also referenced as "thin time slices") over which the data acquisition system (106) passes in the proximity of the accurate reference units (602) and generates a training dataset point.

In some examples, the error function $e_{loss}[k]$ is also expressed in accordance with Equation (4):

$$E_{loss}[k] = h(k)|y(s[k]_{calibrated(predicted)}, p(k), w) - s[k]_{un-calibrated(actual)}|, k \in K \quad (4)$$

wherein h[k] is the positive scale factor determined for the k-th time step, and that puts more emphasis on the minimizing the errors corresponding to the time instances when the data acquisition system (106) is closest to the reference units (602) (FIG. 6C).

In at least one example, to reduce the error $e_{loss}[k]$ at each given data point, an objective function was minimized. In some examples, the objective function was minimized to as low as 1.0e-6.

(iii.) Optimization Model.

Various optimization algorithms can be used including for minimizing the error difference e[k] (FIGS. 4A and 4B), including dichotomous search, interval halving, Fibonacci search, and golden section search algorithms.

XI. Small Form Factor

The data acquisition system (DAS) (106) may be encapsulated in a small form factor, light weight enclosure. In some examples, the DAS (106) is encapsulated in a 2.2"×6"×6" enclosure that weights approximately 2 lbs. or less. More generally, the DAS (106) can be encapsulated in a small form factor while containing more than one ambient parameter (AP) sensor (908a) and/or environmental parameter (EP) sensor (908b) (FIG. 9).

The small, lightweight enclosure is easily mounted to various fixed or mobile platforms (102) (e.g., without specialized deployment skills required). In this manner, the system (200) is highly-scalable, and can include any number of data acquisition systems (106) mounted to fixed poles, or a fleet of vehicles (102). In turn, this allows for ambient parameter (AP) monitoring across a wider geographic area.

As stated earlier, encapsulating the data acquisition system (106) in a small form factor, lightweight enclosure is enabled by relying on data processing for calibration. This is contrasted to systems which rely on large and expensive hardware calibrators and/or stabilizers for high-end sensors (e.g., temperature and humidity stabilizers or vibration platforms), and which are not scalable in the same manner.

XII. Alternative and Specific Examples

In the embodiments of the method (500a), (500b) and (700) described above, it is assumed that the method is implemented by server processor (1002) executing instructions stored on server memory (1004) of server computer (1004).

In other embodiments, any one or more of these act may be implemented by data acquisition system processor (902) executing instructions stored on memory (904) local to the data acquisition system (106). In such embodiments, the processing of these steps may be performed "offline" (without a need for a communications network to transmit the data to another computer system), and the results of methods (500a), (500b) and (700) may be stored in the memory (904) or another memory local to the data acquisition system (106) for retrieval or downloading at a later time.

In still other embodiments, the instructions executed by either or both of the processors (902), (1002) may be stored entirely either on memory (904) or memory (1004), or in a combination of memories (902), (1002). Accordingly, in embodiments, any one or more of these acts, or further computational acts may be implemented entirely by processor (902) of data acquisition system (106), entirely by processor (1002) of server (204), or by a combination of the processors (902), (1002) executing instructions stored entirely either on memory (904) of data acquisition system (106) or on memory (1004) of server computer (204), or on a combination of memories (902), (1002). Any combination of processor(s) and memory or memories implementing these steps may be considered as the "computer system" in the method shown in FIGS. 5A, 5B and 7, and other methods described herein.

In some examples, in method (700)—act (712) can provide an alternative to acts (702) and (704). That is, where the positive scale factor is determined, at act (712), it may not be necessary to initially determine that the data acquisition system (106) is within proximity of a reference sensor units (602) as a "condition" to generating a training dataset point. Rather, the scale factor (h[k]) can function as a logical mathematical filter, in Equation (4), for eliminating training dataset values generated outside the boundary region (604) (FIG. 6A).

For example, in method (700), rather than completing acts (602) and (604)—time-paired training dataset values are generated continuously by the system, or at the sensor sampling rate. Training values that are generated outside the boundary region (604) (FIG. 6C) are automatically assigned a positive scale factor of "0". Accordingly, during calibration model training, these training values are weighted by a zero factor, thereby automatically negating the relevance of these values in Equation (4). In this manner, the positive scale factors function to filter training dataset values obtained far away from the reference unit (602), without performing acts (602) and (604).

XIII. Example Hardware Configurations

Various example hardware configurations for various systems and devices are now described herein.
(i.) Example Configuration for Data Acquisition System (DAS).

Reference is now made to FIG. 9, which shows a simplified block diagram for an example hardware architecture for a data acquisition system (106).

As shown, the data acquisition system (106) can include at least one processor (902) operatively coupled, via a computer data bus, to one or more of a memory (904), a power input (906), a sensor subsystem (908), a data communication interface (910), a GPS module (912). In some examples, the processor (902) is also coupled to a mobile platform data input interface (314).

Sensor subsystem (908)—also referenced herein as a data acquisition system (DAS) sensor subsystem (908)—can include one or more DAS AP sensors (908a) and EP sensors (908b).

In at least one example, the sensor subsystem (908) can include sensors which measure various ambient parameters (APs), including various ambient gas parameters. Examples of sensors in the sensor subsystem (908) for measuring ambient gas parameters include a nitrogen dioxide concentration sensor (908a1), an ozone concentration sensor (908a2), a carbon monoxide concentration sensor (908a3) and a particular concentration (e.g., lead concentration) sensor (908a4).

Sensor subsystem (908) can also include a number of other sensors, for measuring other environmental parameters (EPs). By way of example, these include a relative humidity (RH) sensor (908b1), a wind speed sensor (908b2), an air temperature (T) sensor (908b3) and a barometric pressure (P) sensor (908b4).

More generally, sensor subsystem (908) may be implemented by digital electrochemical sensors, thermometers, pressure sensors, hygrometers, anemometers, and other sensor devices known in the art that are capable of measuring the applicable APs of interest to generate sensor data in digital form.

In at least one example, sensors-comprising sensor subsystem (908)—are physically proximate to each other. In this manner, the sensors generate sensor data (e.g., air quality) in substantially the same location. The sensors, or sensor subsystem (908), may be attached to a common housing mounted on a mobile platform (102), such as vehicle (102).

Processor (902) and memory (904) can collectively form a microcontroller. The microcontroller includes firmware coded in memory (904) configuring processor (902) to control sensor subsystem (908) for acquisition of sensor data, and to control data communication interface (910) for transmission of sensor data via a communications network. It will be understood by those of skill in the art that references herein to data acquisition system (106) as carrying out a function or acting in a particular way imply that processor (902) is executing instructions (e.g., a software program) stored in memory (404) and possibly transmitting or receiving inputs and outputs via one or more interface.

Power input (906) may receive electrical power from a supply such as a battery of the mobile system (106), or a vehicle or other type of mobile platform, or a solar panel.

Data communication interface (910) may comprise any combination of hardware and/or software that allows for transmission of the sensor data from mobile system (106) via a communications network (206). In at least one embodiment, data communication interface (910) may comprise a cellular modem and antenna for wireless transmission of sensor data to the communications network.

GPS module (912) generates location data, indicative of the location of the data acquisition system (106). In some cases, GPS module (912) generates other kinematic data of the data acquisition system (106), such as its distance travelled, direction of movement, speed, and/or acceleration.

Mobile platform data input interface (914) may comprise any combination of hardware and software for receiving data from a system of a mobile platform (102) to which a mobile data acquisition system (106) may be mounted.

For example, in embodiments where the mobile platform (102) is a vehicle or a portable computer equipped with its own GPS module and/or telematics system for monitoring the mobile platform's location, distance travelled, direction of movement, speed, and/or acceleration—the mobile platform data input interface (914) may comprise a wired or wireless data bus for communication with such GPS module and/or telematics system. Thus, the data acquisition system (106) may "piggyback" on the mobile platform's GPS module and/or telematics system, and the data acquit ion system (106) need not have its own GPS module (912). Data received from the mobile platform data input interface (914) is referenced herein collectively as mobile platform data.

While not explicitly illustrated, the data acquisition system (106) can also include an analog-to-digital converter (ADC), interposed between and otherwise coupling the processor (902) to the sensor subsystem (908). The ADC can be a high-resolution ADC to maintain highly accurate digital conversion of sensor readings. For example, the ADC may have 16-bit or 24-bit resolution. In various examples, sensor data processed by the ADC is used during training of the calibration model(s).
(ii.) Example Configuration for Reference Sensor Unit.

While not explicitly shown, each reference sensor unit (602) may have an analogous architecture to the data acquisition system (106). In other words, the reference units (602) may also have a corresponding processor coupled to a memory, a reference unit sensor subsystem and a data communication interface. The sensor subsystem can include one or more sensors for monitoring various types of APs in a localized area, around the reference units (202), as well as high resolution ADC. The sensor units (602) may not, however, necessarily always include a GPS module (912) or a mobile platform data input interface (914). However, these can be included if the reference unit is mobile.

As noted previously, a differentiating factor is that the sensor subsystem—in the reference sensor units (602)—may use higher quality, more expensive sensors (e.g., scientific-grade sensors). Further, the reference sensor units (602) can also include other hardware (e.g., calibration or stabilization hardware), as explained previously.

In at least one example, multiple reference units (602) may share some common hardware. For example, multiple reference units (602) may share a common processor, memory and/or communication interface. In some example, different reference sensor units (202) may have sensor subsystems (908) equipped with different types of sensors, for measuring different types of APs.

(iii.) Example Hardware Configuration for Computer Server.

Reference is now made to FIG. 10, which shows a simplified block diagram of an example computer server (204).

As shown, the computer server (204) includes a processor (1002) operatively connected to one or more of a memory (1004), a power input (1008), a data communication interface (1006), and optionally a display device (1010).

In at least one embodiment, processor (1002) may be implemented by a CPU, and memory (1004) may be implemented by a hard drive or solid-state memory. It will be understood by those of skill in the art that references herein to server (204) as carrying out a function or acting in a particular way imply that processor (1002) is executing instructions (e.g., a software program) stored in memory (1004) and possibly transmitting or receiving inputs and outputs via one or more interface.

In some examples, memory (1004) stores one or more trained forward calibration models (1004a) trained to calibrate AP values generated by one or more mobile sensors. The instructions, corresponding to the trained model, are executable by processor (1002) to implement steps of the method of the present disclosure as described below.

Memory (1004) can also store training dataset values (1004b), which are used to train an initially un-trained calibration model, which can also be hosted on memory (1004). As explained herein, the training dataset values (1004b) can correspond to an aggregate of AP values generated by mobile and stationary sensors, among other sensors.

Data communication interface (1006) may comprise any combination of hardware and/or software that allows for reception of sensor data, and transmission of output data via a communications network. In some embodiments, data communication interface (906) may comprise an Internet modem.

Display device (1010) may be any device that allows for display of data in text and/or graphical form. In some embodiments, the display device (1010) is a computer display monitor.

XIV. Interpretation

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The invention claimed is:

1. A method performed by a mobile platform comprising:
measuring, by at least one gaseous component concentration sensor, an uncalibrated sensor value ($s[k]_{un\text{-}calibrated\ (actual)}$) that indicates a concentration of gas;
receiving, by an analog to digital converter connected to a processor, an analog signal from the gaseous component concentration sensor that represents an uncalibrated sensor value ($s[k]_{un\text{-}calibrated\ (actual)}$), which indicates the measured concentration of gas or suspended particulate matter;
detecting proximity to a stationary reference unit that is external to the mobile platform;
determining one or more accuracy-enhancing parameters ($p[k]$) based on the proximity to the stationary reference unit;
repeating a set of operations until a difference between the $s[k]_{un\text{-}calibrated\ (actual)}$ and a predicted un-calibrated sensor value ($s[k]_{un\text{-}calibrated\ (predicted)}$) is below a predetermined threshold, the set of operations comprising:
i) generating, using an optimization model, a predicted calibrated sensor value ($s[k]_{calibrated\ (predicted)}$) based on the $s[k]_{un\text{-}calibrated\ (actual)}$ and the $s[k]_{un\text{-}calibrated\ (predicted)}$;
wherein the optimization model utilizes an optimization algorithm selected from the group of dichotomous search, interval halving, Fibonacci search, and golden section search algorithm;
ii) generating the $s[k]_{un\text{-}calibrated\ (predicted)}$ using a trained forward calibration model based on the $s[k]_{calibrated\ (predicted)}$ and the $p[k]$; and
transmitting a message to a cloud server that indicates the $s[k]_{calibrated\ (predicted)}$ as a calibrated sensor value.

2. The method of claim 1, wherein detecting proximity to the stationary reference unit comprises determining a geographic location of the mobile platform in relation to a geographic location of the stationary reference unit.

3. The method of claim 2, wherein determining geographic location of the mobile platform in relation to a geographic location of the stationary reference unit comprises:
receiving, from a GPS module connected to the processor, a signal indicating the geographical location of the mobile platform; and
calculating a distance between the geographical location of the mobile platform and the geographic location of the stationary reference unit.

4. The method of claim 1, wherein the gaseous component concentration sensor is configured to measure the concentration of gas in air, and the gas is at least one of carbon monoxide (CO), carbon dioxide ($CO_2$), nitrous oxide (NO), nitrogen dioxide ($NO_2$), ozone ($O_3$), methane ($CH_4$), or sulfur dioxide ($SO_2$).

5. The method of claim 1, further comprising retraining the trained forward calibration model.

6. The method of claim 5, further comprising determining that a trigger condition has occurred, wherein the retraining of the trained forward calibration model is based on the determination that the trigger condition has occurred.

7. The method of claim 6, wherein the trigger condition comprises at least one of the following: a change of season, a change in weather temperature, proximity to a specified stationary reference unit, proximity to an unrecognized stationary reference unit, replacement of the gaseous component concentration sensor, or elapsing of a specified time.

8. A mobile platform comprising:
a processor;
an analog to digital converter connected to the processor;
at least one gaseous component concentration sensor connected to the analog to digital converter;
memory connected to the processor, wherein the memory comprises instructions that, when read by the processor, cause the processor to:
measure, by the at least one gaseous component concentration sensor, an uncalibrated sensor value ($s[k]_{un\text{-}calibrated\ (actual)}$) that indicates a concentration of gas;
receive, via the analog to digital converter, an analog signal from the gaseous component concentration sensor that represents an uncalibrated sensor value ($s[k]_{un\text{-}calibrated\ (actual)}$), which indicates the measured concentration of gas or suspended particulate matter;
detect proximity to a stationary reference unit that is external to the mobile platform;
determining one or more accuracy-enhancing parameters ($p[k]$) based on the proximity to the stationary reference unit;
repeating a set of operations until a difference between the $s[k]_{un\text{-}calibrated\ (actual)}$ and a predicted un-calibrated sensor value ($s[k]_{un\text{-}calibrated\ (predicted)}$) is below a predetermined threshold, the set of operations comprising:
i) generating, using an optimization model, a predicted calibrated sensor value ($s[k]_{calibrated\ (predicted)}$) based on the $s[k]_{un\text{-}calibrated\ (actual)}$ and the $s[k]_{un\text{-}calibrated\ (predicted)}$;
wherein the optimization model utilizes an optimization algorithm selected from the group of dichotomous search, interval halving, Fibonacci search, and golden section search algorithm; and
ii) generating the $s[k]_{un\text{-}calibrated\ (predicted)}$ using a trained forward calibration model based on the $s[k]_{calibrated\ (predicted)}$ and the $p[k]$; and
transmit a message to a cloud server that indicates the $s[k]_{calibrated\ (predicted)}$ as a calibrated sensor value.

9. The method of claim 8, wherein detecting proximity to the stationary reference unit comprises determining a geographic location of the mobile platform in relation to a geographic location of the stationary reference unit.

10. The mobile platform of claim 9, wherein the mobile platform further comprises a GPS module connected to the processor, and wherein determining geographic location of the mobile platform in relation to a geographic location of the stationary reference unit comprises:
receiving, from the GPS module, a signal indicating the geographical location of the mobile platform; and calculating a distance between the geographical location of the mobile platform and the geographic location of the stationary reference unit.

11. The mobile platform of claim 8, wherein the gaseous component concentration sensor is configured to measure the concentration of gas in air, and the gas is at least one of carbon monoxide (CO), carbon dioxide ($CO_2$), nitrous oxide (NO), nitrogen dioxide ($NO_2$), ozone ($O_3$), methane ($CH_4$), or sulfur dioxide ($SO_2$).

12. The mobile platform of claim 8, wherein the memory further comprises instructions that, when read by the processor, cause the processor to retrain the trained forward calibration model.

13. The mobile platform of claim 12, wherein the memory further comprises instructions that, when read by the processor, cause the processor to determine that a trigger condition has occurred, wherein the retraining of the trained forward calibration model is based on the determination that the trigger condition has occurred.

14. The mobile platform of claim 13, wherein the trigger condition comprises at least one of the following: a change of season, a change in weather temperature, proximity to a specified stationary reference unit, proximity to an unrecognized stationary reference unit, replacement of the gaseous component concentration sensor, or elapsing of a specified time.

15. A non-transitory computer readable medium that includes instructions that, when read by a processor of a mobile platform, cause the processor to:
cause measurement, by at least one gaseous component concentration sensor, an uncalibrated sensor value ($s[k]_{un\text{-}calibrated\ (actual)}$) that indicates a concentration of gas;
receive, by an analog to digital converter connected to the processor, an analog signal from the gaseous component concentration sensor that represents an uncalibrated sensor value ($s[k]_{un\text{-}calibrated\ (actual)}$), which indicates the measured concentration of gas or suspended particulate matter;
detect proximity to a stationary reference unit that is external to the mobile platform;
determine one or more accuracy-enhancing parameters (p[k]) based on the proximity to the stationary reference unit;
repeat a set of operations until a difference between the $s[k]_{un\text{-}calibrated\ (actual)}$ and a predicted un-calibrated sensor value ($s[k]_{un\text{-}calibrated\ (predicted)}$) is below a predetermined threshold, the set of operations comprising:
i) generating, using an optimization model, a predicted calibrated sensor value ($s[k]_{calibrated\ (predicted)}$) based on the $s[k]_{un\text{-}calibrated\ (actual)}$ and the $s[k]_{un\text{-}calibrated\ (predicted)}$;
wherein the optimization model utilizes an optimization algorithm selected from the group of dichotomous search, interval halving, Fibonacci search, and golden section search algorithm;
ii) generating the $s[k]_{un\text{-}calibrated\ (predicted)}$ using a trained forward calibration model based on the $s[k]_{calibrated\ (predicted)}$ and the p[k]; and
transmit a message to a cloud server that indicates the $s[k]_{calibrated\ (predicted)}$ as a calibrated sensor value.

16. The computer readable medium of claim 15, wherein detecting proximity to the stationary reference unit comprises determining a geographic location of the mobile platform in relation to a geographic location of the stationary reference unit.

17. The computer readable medium of claim 16, wherein determining geographic location of the mobile platform in relation to a geographic location of the stationary reference unit comprises:
receiving, from a GPS module connected to the processor, a signal indicating the geographical location of the mobile platform; and
calculating a distance between the geographical location of the mobile platform and the geographic location of the stationary reference unit.

18. The computer readable medium of claim 15, wherein the gaseous component concentration sensor is configured to measure the concentration of gas in air, and the gas is at least one of carbon monoxide (CO), carbon dioxide ($CO_2$), nitrous oxide (NO), nitrogen dioxide ($NO_2$), ozone ($O_3$), methane ($CH_4$), or sulfur dioxide ($SO_2$).

19. The computer readable medium of claim 15, wherein the instructions further cause the processor to retrain the trained forward calibration model.

20. The computer readable medium of claim 19, wherein the instructions further cause the processor to determine that a trigger condition has occurred, wherein the retraining of the trained forward calibration model is based on the determination that the trigger condition has occurred.

* * * * *